US008356989B2

(12) United States Patent
Waldrop et al.

(10) Patent No.: US 8,356,989 B2
(45) Date of Patent: Jan. 22, 2013

(54) DOUBLE BAG VACUUM INFUSION PROCESS AND SYSTEM FOR LOW COST, ADVANCED COMPOSITE FABRICATION

(75) Inventors: John C. Waldrop, St. Peters, MO (US); William R. Burkett, St. Louis, MO (US); Carmine J. Sesti, St. Peters, MO (US); Bruce Harshman, Wentzville, MO (US); Alan F. Tegeler, O'Fallon, MO (US); Wesley P. Weinman, Brighton, IL (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 12/042,269

(22) Filed: Mar. 4, 2008

(65) Prior Publication Data

US 2008/0220112 A1   Sep. 11, 2008

Related U.S. Application Data

(62) Division of application No. 09/731,945, filed on Dec. 7, 2000, now Pat. No. 7,413,694.

(60) Provisional application No. 60/169,531, filed on Dec. 7, 1999.

(51) Int. Cl.
*B29C 70/44* (2006.01)

(52) U.S. Cl. ........ 425/388; 425/112; 425/121; 425/389; 425/403; 425/504

(58) Field of Classification Search .............. 425/380, 425/388, 389, 403, 405.1, 504, DIG. 47, 425/DIG. 60, 111, 112, 117, 121
See application file for complete search history.

(56) References Cited

U.S. PATENT DOCUMENTS

| | | | |
|---|---|---|---|
| 3,983,282 A | 9/1976 | Seemann, III | |
| 4,016,022 A | 4/1977 | Browning | |
| 4,120,632 A | 10/1978 | Stoeberl | |
| 4,132,755 A | 1/1979 | Johnson | |
| 4,311,661 A * | 1/1982 | Palmer | 264/510 |
| 4,357,193 A * | 11/1982 | McGann et al. | 156/286 |
| 4,421,589 A * | 12/1983 | Armini et al. | 156/382 |
| 4,504,341 A * | 3/1985 | Radzwill et al. | 156/102 |
| 4,562,033 A * | 12/1985 | Johnson et al. | 264/510 |
| 4,622,091 A * | 11/1986 | Letterman | 156/286 |
| 4,816,106 A * | 3/1989 | Turris et al. | 156/285 |
| 4,828,639 A * | 5/1989 | Aker et al. | 156/245 |
| 4,902,215 A * | 2/1990 | Seemann, III | 425/406 |
| 4,915,896 A * | 4/1990 | Rachal et al. | 264/511 |

(Continued)

FOREIGN PATENT DOCUMENTS

| | | |
|---|---|---|
| EP | 0348831 A2 | 1/1990 |
| EP | 0816438 A2 | 1/1998 |

(Continued)

OTHER PUBLICATIONS

USPTO Notice of allowance dated Feb. 4, 2008 regarding U.S. Appl. No. 09/731,945 (17 pages).

(Continued)

*Primary Examiner* — Joseph Del Sole
*Assistant Examiner* — Seyed Masoud Malekzadeh
(74) *Attorney, Agent, or Firm* — Yee & Associates, P.C.

(57) ABSTRACT

Boeing is actively engaged in the production of lightweight composite airframes for both military and commercial applications. The double bag vacuum infusion process of the present invention provides a low cost, method for producing complex composite assemblies without an autoclave. It also enables the production of highly innovative structures. The quality of the composites produced using such an infusion process are comparable to composites made using prepregs, hand layup or fiber placement and autoclave curing.

9 Claims, 9 Drawing Sheets

U.S. PATENT DOCUMENTS

| | | | | | |
|---|---|---|---|---|---|
| 4,942,013 | A | * | 7/1990 | Palmer et al. | 264/511 |
| 5,052,906 | A | | 10/1991 | Seemann | |
| 5,106,568 | A | * | 4/1992 | Honka | 264/510 |
| 5,116,216 | A | * | 5/1992 | Cochran et al. | 425/504 |
| 5,123,985 | A | * | 6/1992 | Evans et al. | 156/213 |
| 5,129,813 | A | * | 7/1992 | Shepherd | 425/504 |
| 5,236,646 | A | * | 8/1993 | Cochran et al. | 264/102 |
| 5,281,388 | A | * | 1/1994 | Palmer et al. | 264/571 |
| 5,316,462 | A | | 5/1994 | Seemann | |
| 5,354,195 | A | * | 10/1994 | Dublinski et al. | 425/504 |
| 5,364,584 | A | * | 11/1994 | Imanara et al. | 264/510 |
| 5,368,807 | A | * | 11/1994 | Lindsay | 264/510 |
| 5,427,725 | A | | 6/1995 | White et al. | |
| 5,439,635 | A | * | 8/1995 | Seemann | 264/510 |
| 5,441,692 | A | | 8/1995 | Taricco | |
| 5,484,277 | A | * | 1/1996 | Lindsay | 425/388 |
| 5,527,414 | A | * | 6/1996 | Dublinski et al. | 156/245 |
| 5,576,030 | A | * | 11/1996 | Hooper | 425/112 |
| 5,601,852 | A | | 2/1997 | Seemann | |
| 5,688,353 | A | * | 11/1997 | Dublinski et al. | 156/256 |
| 5,702,663 | A | * | 12/1997 | Seemann | 264/510 |
| 5,721,034 | A | | 2/1998 | Seemann, III et al. | |
| 5,772,950 | A | * | 6/1998 | Brustad et al. | 264/510 |
| 5,863,452 | A | * | 1/1999 | Harshberger et al. | 249/83 |
| 5,897,739 | A | * | 4/1999 | Forster et al. | 156/285 |
| 5,904,972 | A | * | 5/1999 | Tunis et al. | 428/178 |
| 5,939,013 | A | | 8/1999 | Han et al. | |
| 5,958,325 | A | | 9/1999 | Seemann, III et al. | |
| 5,968,445 | A | * | 10/1999 | McCarville et al. | 264/571 |
| 6,017,484 | A | * | 1/2000 | Hale | 264/510 |
| 6,090,335 | A | | 7/2000 | McClure et al. | |
| 6,257,858 | B1 | * | 7/2001 | Pabsch et al. | 425/129.1 |
| 6,290,895 | B1 | * | 9/2001 | Wang et al. | 264/510 |
| 6,299,819 | B1 | | 10/2001 | Han | |
| 6,391,436 | B1 | * | 5/2002 | Xu et al. | 428/298.1 |
| 6,406,659 | B1 | * | 6/2002 | Lang et al. | 264/510 |
| 6,495,088 | B1 | * | 12/2002 | Coffin et al. | 264/510 |
| 6,506,325 | B1 | * | 1/2003 | Cartwright | 264/40.6 |
| 6,537,483 | B1 | * | 3/2003 | Cartwright et al. | 264/511 |
| 7,413,694 | B2 | | 8/2008 | Waldrop et al. | |
| 2002/0022422 | A1 | | 2/2002 | Waldrop, III et al. | |

FOREIGN PATENT DOCUMENTS

| | | |
|---|---|---|
| EP | 1038656 A1 | 9/2000 |
| WO | 0141993 A2 | 6/2001 |

OTHER PUBLICATIONS

USPTO Final office action dated Aug. 20, 2007 regarding U.S. Appl. No. 09/731,945 (20 pages).
USPTO Interview summary dated Apr. 6, 2007 regarding U.S. Appl. No. 09/731,945 (4 pages).
USPTO Non-final office action dated Mar. 23, 2007 regarding U.S. Appl. No. 09/731,945 (11 pages).
USPTO Final office action dated Jan. 24, 2007 regarding U.S. Appl. No. 09/731,945 (13 pages).
USPTO Non-final office action dated Jul. 11, 2006 regarding U.S. Appl. No. 09/731,945 (11 pages).
USPTO Final office action dated Jan. 12, 2005 regarding U.S. Appl. No. 09/731,945 (16 pages).
USPTO Non-final office action dated Jan. 29, 2004 regarding U.S. Appl. No. 09/731,945 (13 pages).
USPTO Final office action dated Feb. 26, 2003 regarding U.S. Appl. No. 09/731,945 (17 pages).
USPTO Non-final office action/restriction requirement dated Jun. 25, 2002 regarding U.S. Appl. No. 09/731,945 (16 pages).
Amendment submitted with filing of RCE dated Oct. 30, 2007 regarding U.S. Appl. No. 09/731,945 (16 pages).
USPTO Interview summary dated Oct. 11, 2007 regarding U.S. Appl. No. 09/731,945 (12 pages).
Amendment and Response After Final Rejection Under 37 C.F.R. Section 1.116 dated Oct. 5, 2007 regarding U.S. Appl. No. 09/731,945 (43 pages).
Amendment and Response Under 37 C.F.R. Section 1.11 dated Apr. 17, 2007 regarding U.S. Appl. No. 09/731,945 (22 pages).
Amendment and Response After Final Rejection Under 37 C.F.R. Section 1.116 dated Feb. 22, 2007 regarding U.S. Appl. No. 09/731,945 (14 pages).
Response to Miscellaneous Communication dated Nov. 8, 2006 regarding U.S. Appl. No. 09/731,945 (11 pages).
Amendment Submitted with filing of RCE dated Apr. 24, 2006 regarding U.S. Appl. No. 09/731,945 (10 pages).
Reply brief dated Nov. 10, 2005 dated Nov. 8, 2006 regarding U.S. Appl. No. 09/731,945 (15 pages).
Examiner's Answer to Appeal Brief dated Sep. 8, 2005 regarding U.S. Appl. No. 09/731,945 (16 pages).
Appeal Brief Under 37 C.F.R. Section 41.37 dated Jun. 24, 2005 regarding U.S. Appl. No. 09/731,945 (15 pages).
Supplemental Brief on Appeal dated Nov. 17, 2003 regarding U.S. Appl. No. 09/731,945 (16 pages).
Appeal Brief dated Sep. 2, 2003 regarding U.S. Appl. No. 09/731,945 (18 pages).
Amendment After Final Rejection dated Aug. 24, 2006 regarding U.S. Appl. No. 09/731,945 (4 pages).
Amendment After Non-final Rejection dated Dec. 4, 2002 regarding U.S. Appl. No. 09/731,945 (6 pages).
Preliminary Amendment dated Apr. 2, 2001 regarding U.S. Appl. No. 09/731,945 (22 pages).
Williams et al., "Resin Infusion Under Flexible Tooling (RIFT): a review," Elsevier Science Ltd., Composites Part A272A, Jan. 1, 1996, pp. 517-524.
von Dr. Jens-Peter Schik and Reinhold Seigberg, "Eine fortschrittliche GFK-Fertigungstechnik setzt sich durch: Praxiserfahrungen mit den Vakuum-Injektions-Verfahren," XP-002169062, Oct. 27, 1988, pp. 13-19 (German language article not available in English).
Dipl.-Ing. Jochen Hohfeld, Dr. Michael J. Drews and Dipl.-Ing. Ralf Kaldenhoff, "Consolidation of thick, close, circular knitted glass fiber textiles with epoxy resin into flat panels, tubes and t-profiles," in 3rd International Conference of Flow Processes in Composite Materials, Jul. 7-9, 1994, pp. 120-142.
Brittles, "New Developments in Resin Transfer Moulding," Proceedings of the 19th International Composites Congress, Nov. 1994, pp. 11-26.
International Search Report, dated Jul. 9, 2001, regarding Application No. PCT/US00/33163 (WO0141993), 2 pages.
Waldrop et al., "Double Vacuum Infusion Process and System for Low Cost, Advanced Composite Fabrication," USPTO U.S. Appl. No. 13/480,293, filed May 24, 2012, 64 pages.
Response to Final Office Action, dated Aug. 25, 2003, regarding U.S. Appl. No. 09/731,945, 4 pages.
Response to Office Action, dated May 5, 2004, regarding U.S. Appl. No. 09/731,945, 10 pages.
Response to Notice of Non-Compliant Amendment, dated Jun. 7, 2004, regarding U.S. Appl. No. 09/731,945, 10 pages.
Supplemental Response to Notice of Non-Compliant Amendment, dated Oct. 24, 2004, regarding U.S. Appl. No. 09/731,945, 4 pages.
USPTO Board of Patent Appeals and Interferences Decision on Appeal, dated Mar. 29, 2006, regarding U.S. Appl. No. 09/731,764, 9 pages.
Response to Office Action, dated Aug. 18, 2006, regarding U.S. Appl. No. 09/731,945, 11 pages.

* cited by examiner

DOUBLE BAG VACUUM INFUSION PROCESS AND SYSTEM FOR LOW COST, ADVANCED COMPOSITE FABRICATION

CROSS REFERENCE TO RELATED APPLICATIONS

The present application claims the benefit of U.S. Provisional patent Application 60/169,531, filed Dec. 7, 1999, and is also a divisional of U.S. Application Ser. No. 09/731,945, filed Dec. 7, 2000 now U.S. Pat. No. 7,413,694, all are incorporated herein by reference.

TECHNICAL FIELD

The present invention relates to methods for making composites and to the products so made, particularly to liquid molding processes including vacuum-assisted resin transfer molding (VaRTM) or resin infusion.

BACKGROUND OF THE INVENTION

Marine, automotive, trucking, rail, aerospace, defense, recreation, chemical, infrastructure, and other industries look to composite materials to take advantage of their unique properties, especially being corrosion-free or corrosion-resistant and having a high strength-to-weight ratio. Composites are also resistant to fatigue and chemical attack. They offer high strength and stiffness potential in lightweight components. There is a need, however, to develop composite manufacturing processes that dramatically reduces the cost of composites, especially large structures, while retaining their high strength and stiffness.

Resin-impregnated fibrous materials (prepregs) generally are placed on a forming mandrel ("laid up") by hand or machine using tape, fiber tows, or cloth. Composites also have been made using filament winding. Debulking is required between plies in a laminate to remove air before the layups are vacuum bagged (i.e., enclosed in an inert atmosphere under vacuum to withdraw emitted volatiles released during cure of the resin) and consolidated in autoclaves or presses to achieve high fiber volume components. The prepreg materials typically are expensive (especially those using high modulus carbon fiber). The raw prepreg materials have limited shelf lives, because the resins react at slow rates ("advance") at ambient temperature. Advance of the resin adversely effects the properties of the resulting composite. Working with prepreg also often results in considerable material waste.

The autoclaves and presses used for consolidation are expensive capital items that further increase the final, manufactured cost of the composite. Processing has to be centralized and performed in batches where the autoclave or press is installed. Loading and unloading the autoclave (a high temperature, pressurized oven) usually become the rate limiting steps. The location of the autoclave dictates where the composites will be made, so the flexibility of the process is impaired. A dedicated workforce and facility are required, centered around the autoclave.

As mentioned, prepregs have a limited shelf life. In some formulations, the resin is carried onto the fiber as a lacquer or varnish containing the monomer reactants that will produce the desired polymer in the composite (i.e., prepregs of the PMR-type). In other formulations, the resin is a relatively low molecular weight polymer that crosslinks during cure to form the desired polymer. The resin is held and used in its incomplete state so that it remains a liquid, and can be impregnated onto the fiber or fabric. Reaction of the monomer reactants or crosslinking of the polymer (i.e., its advancing) prior to the intended cure cycle adversely impacts the quality of the composite.

Liquid molding techniques such as transfer molding, resin film infusion, resin transfer molding, and structural reaction injection molding (SRIM) typically require expensive matched metal dies and high tonnage presses or autoclaves. Parts produced with these processes are generally limited in size and geometry. The conventional liquid molding resins do not provide the necessary properties for many applications of composites.

Open mold wet layup processing can make large composites using a liquid molding process with minimal capital equipment, single sided tooling, and often can use lower cost materials than prepreg. The quality and uniformity of the product, however, varies considerably and the best composites are still relatively low quality. The process also tends to be unfriendly and presents hazards to workers because of their risk of exposure to the solvents and resins.

Our double bag vacuum infusion (DBVI) process solves a number of problems encountered with previously developed, nonautoclave, single bag, liquid molding techniques, such as those processes described in U.S. Pat. Nos. 4,902,215 (Seemann) and 4,942,013 (Palmer). In the Seemann single bag technique, preferential flow and pressure is induced in the flow media above the fiber preform. The driving force is a pressure differential or head pressure created primarily by drawing down the pressure inside the bag using a vacuum pump. Atmospheric pressure on the resin feed pushes resin into the bag through an inlet tube. Resin entering the bag encounters the flow media used to channel the resin to the underlying fiber preform. Resin flows laterally through the flow media over the preform and, subsequently, downwardly into the preform. The preform has the lowest permeability to flow (i.e., the highest resistance to the flow of resin).

Once the liquid media (i.e., resin) is pulled (i.e., flows) into the preform, we have observed that the single bag tends to relax behind the wave front (i.e., the foremost portion of the resin that is moving into the preform within the bag). When the flow media is full or partially full of resin, we believe that the bag slowly relaxes and moves away from the flow media presumably because the flow path of least resistance becomes a path over the flow media between the flow media and the overlying bag. Relaxation increases the enclosed volume around the preform, which becomes filled with resin. The farther away from the leading edge of the wave front, the more the bag tends to relax. We have observed that the composite in areas where the bag has relaxed can have lower fiber volume, poor fiber volume control, and lower mechanical properties than desired, because excess resin has filled the enlarged volume. The bag relaxation can produce a change in the intended thickness of the composite, so that in localized areas where relaxation has occurred the composite is thicker than intended.

In the ensuing discussion, we will compare the Seemann and Palmer processes with our preferred double bag process of the present invention.

Our preferred double bag vacuum infusion process circumvents the Seemann (single bag) problems in that the inner and outer vacuum bags independently control the resin feed. The double bag provides a caul effect. The bleeder and breather sections are completely isolated. With this approach, the bag is never able to relax behind the wave front and the resulting composites have higher fiber volumes on average (with more precise control) and have uniform thickness with constant thickness preforms. Our process eliminates the bag relaxation defects we observed with the Seemann process.

During relaxation, we observe that resin pools inside the bag. Pressing on the pool, we feel a soft, spongy, loose area different from the feel where relaxation is not occurring. The bag stretches and the volume under the bag increases. In circumstances of relaxation, we have observed that pressurizing the resin feed above atmospheric increases the relaxation, so the phenomenon appears to be tied to the pressure differential and the driving force for resin flow, as we would expect. Adding a second vacuum bag (separated from the first bag with a breather) makes it harder for the "double bag" to relax. Therefore, we can use a higher differential pressure to move the resin than might best be employed with a single bag. The "double bag" becomes a means to reduce flow over the filled flow media because the vacuum bag effectively is thicker. The "double bag" also provides increased vacuum integrity because it provides a redundant, second bag to counter any leaks in the first bag.

In Boeing's "Controlled Atmosphere Pressure Resin Infusion" (CAPRI) process, Jack Woods et al. control the differential pressure by reducing the pressure below atmospheric in the resin feed tank. In the CAPRI process, a vacuum pump evacuates the volume under the vacuum bag while, simultaneously, reducing the pressure over the feed resin. Pressure in the vacuum bag might be .sup.31 20 inches Hg below atmospheric and .sup.-5 inches Hg in the feed pot for a differential pressure to drive resin infusion of 15 inches Hg (.about.0.5 atm).

The Palmer process attempted to isolate the bleeder and the breather sections by placing an impervious film between the flow media and the breather inside the single bag. Unfortunately, this technique did not allow complete isolation. Once the liquid medium reached the vacuum end of the assembly, the flow media and the breather were connected. As a result, the resin began to wet the breather and to flow back toward the resin source over the membrane because this path had higher permeability than flow downwardly through the preform.

Our preferred double bag process allows fiber volume percentage or fraction in the composite to be increased 5-10% higher than we have been able to achieve with the single bag technologies of Seemann and Palmer. An increased fiber volume is critical to achieve an aerospace grade composite that has properties competitive with conventional vacuum bag/autoclave prepreg technologies commonly used in aerospace. Aerospace composites have superior 'specific strengths' which are achieved by optimizing (making as high as possible) the fiber volume fraction. Aerospace composites have superior 'specific strengths' which are achieved by optimizing (making as high as possible) the fiber volume fraction. Our process achieves a targeted fiber volume within a close tolerance of acceptable fiber volumes by regulating the vacuum of the inner and outer bags during infusion. Using end game thermal infusion strategies, our process improves preform nesting, fluid drawdown, thermal vacuum debulking and real time mass balance control. Our process has extremely high vacuum integrity.

In any vacuum impregnation process, vacuum integrity is essential to produce high quality composites consistently. Leaks in the bagging seals, resin ports, or vacuum ports will permit air to enter into the bag. Air causes the preforms to swell and reduces the fiber volume fraction by increasing the spacing between fibers. Composites made with leaking bags will typically have one of more of the following problems: high void content, surface porosity, low fiber volumes, or excessive thickness. Parts often need to be scrapped; they cannot be repaired.

In vacuum bag processing, one side of the structure is tooled and the other is defined, at least in part, by the bagging materials used over the layup. Bag side roughness and mark off is a common problem experienced with prepreg processing and bag liquid molding processes. Cauls and intensifiers are often used on the bag side of the laminate to improve surface finish. These surface enhancements, however, are not particularly effective in the Palmer or Seemann process because of the flow medias used. The coarse knotty knit flow media and the bag offset materials described in the Seemann process result in bag side mark off on the parts even in the presence of peel ply separator. Mark off occurs because of localized high pressure at the knit knots or bag offsets with relatively low pressure in surrounding areas. The uneven pressure distribution produces a relatively lumpy bag side surface. Fiber volume and fiber content varies.

Palmer uses glass bleeder cloths to form part of his flow media pack. Layers of dry glass cloth tend to bunch, buckle, and bridge under vacuum causing severe mark off problems even on simple geometric part configurations, not to mention the complications that arise in more complex assemblies.

Used in the Seemann process to achieve rapid lateral flow, thick flow media and bag offsets create relatively large volumes that will ultimately fill with waste resin. In Palmer's process, the flow media, the thick glass packs, and also the glass bleeder diapers waste resin. Palmer also loses resin when it flows beyond the end of the infusion and wets into the breather, as we discussed. We seek to minimize resin waste.

In our preferred process, resin losses in the flow media are reduced because of its low profile and relatively small open volume. Our process also allows for simple purged resin reclamation and recycling without the risk of bag relaxation or the need for continuous resin purging with fresh resin to infuse difficult preforms. Our preferred process conserves resin and reduces cost measurably when working with expensive resin systems, as is common for aerospace applications.

Neither Seemann nor Palmer describes how to produce complex assemblies such as contoured skins with blade stiffeners, where the plumbing requirements are complex. Each stiffener requires an active vacuum line attached at the top of the stiffener to draw the resin up into the stiffener. When there are a large number of stiffeners, the plumbing quickly gets complicated. Each connection requires flawless seams with the bag to preserve vacuum integrity. In our process, some stiffeners can be effectively infused without using active vacuum lines. Inclined infusions where the resin is introduced at the lowest point and pulled up the preform to the highest point can effectively wet out stiffeners running in the flow direction and in some cases other directions as demonstrated in our TYCORE™ sandwich panels.

Our process also can install passive vacuum chambers (PVC) inside the inner bag. Perforated tubes, spiral cut tubes, springs or other open containers are placed above stiffeners or other areas where flow is desired (E, FIG. 8 or 9). The resin or liquid is pulled into these chambers until they fill. The PVCs also provide some purging capability for removing air from preforms.

By "wet out" we mean infusion of the desired amount of resin into the preform to achieve the desired fiber volume in the composite.

The Seemann and Palmer processes can produce parts of almost unlimited length but are limited with respect to part width. Seemann's process can generally produce wide simple shells because Seemann uses flow media having high permeability and bag offsets. Palmer's process is somewhat more limited because it relies on an edge feed method and uses flow media of lower permeability. At some width, however, both the Seemann and Palmer processes require additional feed lines to reduce resin drag and pressure drop in the system, especially where flow on a skin is interrupted with stiffeners. Stiffeners create choke points when the resin is flowing transverse or at an angle relative to the direction of the stiffener. Because of tooling constraints, dimensional control requirements, and shape discontinuities, care must be taken to place flow media materials in stiffener locations properly.

A variety of dry preforms are available for constructing infused components. Both Seamann and Palmer use dry preforms. The options include standard weaves, warp knit materials, 3D braids, 3D woven materials, stitched preforms, Z-pinned preforms, continuous strand mats, and chopped fiber preforms. Many dry preform materials are fragile, easily distorted, damaged, or frayed from simple customary manufacturing operations. Distinct ply dropoffs, part tailoring, and net shapes are difficult to achieve in complex finished parts made from dry preforms. Dry preforms also tend to have excessive bulk for layup of complex shapes where bulk must be minimized to eliminate wrinkling and bagging issues. To compound the problem, layers of the dry materials cannot be debulked and consolidated effectively because of their poor adhesion to other dry plies or to other materials. Offline detail preform fabrication is ineffective. These characteristics make dry preforms difficult, if not impossible, to use in many complex applications. Therefore, tackifier or binder technologies for treating dry preforms with resin necessarily become key elements of almost any liquid molding technology system. The binder must not restrict resin flow or preform consolidation, must be compatible with the infusion resin, and must not produce loss in strength. The process of applying binder or tackifier produces a preform similar to those used in conventional resin transfer molding.

In our preferred process, again, we have developed a unique spray impregnation process to apply the binder or tackifier to the dry fiber preform to produce high tack with low binder content. Desired binder content ranges from about 1 to 10 wt % (i.e., by weight) but typically are from about 3-7 wt %. The desired weight percent depends on the weight and thickness of the preform and the natural or inherent degree of tack in the binder.

Adding solvent to the semi-solid viscous resins is useful as binders produce solutions suitable for spraying. The solvents should have room temperature tack and be compatible with the infusion resin selected. For cyanate ester infusion resins, we typically use CIBA's M-20 semi-solid cyanate ester resin that is extremely tacky at room temperature. Some semi-solid resins with no room temperature tack can be used if they develop tack when heated, for example, 5250-4 RTM bismaleimide resin. The solutions sometimes require catalysts for resin activation. For more latent spray formulations, the catalysts can be eliminated or reduced from the mix to allow higher temperature vacuum debulk operations without adversely advancing the degree of cure of the binder. Binder contents can be increased at ply edges to provide greater dimensional integrity and less edge fraying. The binder might also incorporate thermoplastic or rubber toughening agents for improved damage tolerance and ballistic survivability.

The preferred binder formulations typically have high or very high resin solid contents of 80% by weight or more. The solvent or carrier can be MEK, MIBK, other organic solvent capable of dissolving the semi-solid resin, or, possibly, water. Solvent volatility can be altered and used to control or to adjust tackiness and to change drying time. High solids content, high spray viscosities, and dry film spray parameters are used in conjunction to form uniformly distributed small resin spots that rest on the exposed surface of the preform. The preferred spray parameters minimize solvent emissions, increase transfer efficiencies, allow automation, and maintain maximum preform tack with the least amount of deposited resin and loss in preform permeability.

With these tackified preforms we have demonstrated the ability to produce complex structures such as intersecting blade stiffeners, Pi joint stiffeners, and complex contoured skins with curved blade stiffeners. The binder technology makes it possible to net mold certain features such as blade stiffeners. Vacuum bag, room temperature debulking can produce soft, pliable, tackified preforms. Heated vacuum debulking can produce semi-rigid preforms suitable for precision trimming to close tolerance.

With the Seemann and Palmer processes, the resin must be gelled immediately after part infusion. If you leave the vacuum active on the part, resin from the source is pulled through the preform during the gelling. The resin supply must remain connected to prevent the part from being depleted in resin, For most resins, gelation is initiated thermally. Heating the part to gel the resin in the preform also heats the bulk resin which can lead to a hazardous exothermic condition, including evolution of toxic smoke.

If you close the vacuum and feed lines for the bulk resin prior to heating the preform, leaks might cause air to bleed into the bag. This bleed often produces defective parts that have high void content. The part may swell to create low fiber volume components or, more typically, ones having voids or porosity. The Palmer process requires almost instantaneous gelation, but excessively rapid gelation often produces brittle resin matrices. Many common resins, such as low temperature cure epoxies for high temperature applications, cannot be gelled rapidly.

SUMMARY OF THE INVENTION

The present invention is a liquid molding process and system for producing quality composite structures at low cost. It falls within the categories of resin transfer molding (RTM), particularly vacuum-assisted RTM (VaRTM). The simple tooling, minimal capital requirements, batch processing capability, high yield, and capability to mold complex shapes make the process attractive. For making aerospace structure, it promises to be an economical process, especially suited for large structures, including wing boxes and the like. The present invention dovetails nicely with other enabling technologies such as stitching, Z-direction reinforcement (Z-pinning), electron beam curing, 3-D weaving, and low temperature curing. It does not require an autoclave, matched tooling, or large presses.

High vacuum integrity with a double bag system of our design helps to yield high quality composites consistently with low void content, minimal surface porosity, excellent thickness control, and high fiber volume fractions. The double bag improves stiffness of the bagging material to avoid relaxation behind the wavefront, thereby permitting the infusion of void-free composites having the high fiber volumes desired for aerospace applications. Controlling relaxation effectively means that we can use a higher differential pressure (DP) as the driving force for resin transfer. We can infuse faster or can use more viscous resins because of the larger driving force. We desire fiber volume fractions in excess of 50%.

Resin wave front control produces clean infusions without surface porosity, voids, dry spots, or resin rich zones. Seemann uses thick coarse flow media to direct resin to the underlying preform and bag offsets. The media and offsets create a highly permeable space for rapid resin migration laterally in the bag. The speed of infusion, however, can lead to trapped air or surface porosity defects or voids as the resin percolates down through the thickness of the preform. Lateral flow can exceed downward wetting of the preform, trapping air in pockets. Air trapped behind the wave front becomes difficult to remove from the infused part. Bubbling as air escapes can make it difficult to establish an end point for the infusion.

The key to successful infusions is not the speed with which the preform is infused, but rather the quality of the infusion. Maintaining a controlled wave front with lower permeability flow media over the preform gives cleaner infusions. The flow media we prefer to use should allow the resin to flow laterally slowly enough that the resin can uniformly drop down through the preform to wet out and completely fill the preform with a wedge shaped flow profile. In a controlled flow front, the resin front on the bag side of the preform is only 2 or 3 inches ahead of the resin front on the tool side of the preform assuming flow media is placed only on the bag side of the perform. Infusion includes lateral flow through the media followed by downward flow to fill the preform. We prefer to control the relative permeability of the flow media to that of the preform to achieve this orderly, albeit relatively slow, infusion.

Our unique, open weave, TEFLON impregnated glass flow media (Taconic 7195) controls the flow front because it is thin, has modest permeability, and its fill fibers form flow weirs. Besides controlling resin flow, the media works to solve a number of other issues, This media can withstand exposure to temperatures up to about 600.degree. F. and is chemically inert. It is free of contamination and has excellent release properties. It is readily available, has relatively low foreign object defect potential, and minimizes bag bulk because it is low profile. It reduces or eliminates mark off on the bag side of the laminate with its stiff but pliable nature.

One option to achieve improved flow control uses bagging materials with high elongation (over 500%) and relatively low modulus, such as STRETCHLON 700 polyester and STRETCHLON 800 nylon bagging films. High elongation bagging materials make it easier to bag simple and complex preforms with relatively few bag wrinkles. Preform areas under bag wrinkles tend to have relatively high permeability and can result in undesirable resin channeling along those bag wrinkles. Therefore, minimizing bag wrinkles with high elongation bagging materials improves flow front control.

Another option uses gum rubber seals around the periphery of the part. With no edge seal or solid edge seals, channeling often occurs at the edges of the preform because of the high permeability that exists in the gaps typically found between the preform, bag, and solid seal. Using high elongation bags and gum rubbers seals together with/or without thermal vacuum cycles, a tight seal between the edge of the preform, bag, and seals can be achieved. The gum rubber moves viscoelastically to fill in all the gaps that otherwise exist at the irregular edge of a dry or binderized preform (i.e., a preform having fibers coated with or containing binder or tackifier). Gum rubbers seals have been found to be particularly useful when dealing with thick preforms where one has large bag discontinuities at the edge of the part. Bag bridging at these locations allows excessive channeling. Gum rubber seals, however, work to seal the edge effectively, ease the bag transition, and reduce the effects of edge tapering on the preform from bag stresses.

A double ended vacuum pull off technique successfully defeats channeling that may occur for any number of reasons. If resin channels along one edge of the part, the potentially "fatal" problem can be simply corrected by clamping the vacuum tube on the channeled side and continuing the vacuum infusion with the opposite vacuum line in an active mode.

Another method proven to defeat channeling is to infuse preforms in an inclined orientation with the resin being fed at the lowest elevation and moving upwardly through the preform with vacuum through ports located at the highest elevation. With this method, gravity helps to maintain a constant fluid level in the preform and resists resin flow, at least partially. Some preforms, such as multi-axial warp knit preforms with bundled unidirectional fibers can have naturally occurring permeability variations that can cause poorer flow control than in preforms using more consistent materials such as 5 and 8 harness satin cloth.

A thermal vacuum cycle used prior to infusion also minimizes channeling. Here, the preform gets debulked (i.e., compressed while having air removed from between plies) to a thickness within about 10% greater than its final thickness. Likewise, the bag's modulus drops at elevated temperature where it more easily elongates. As the bag elongates, it fits better and better to the underlying preform material, eliminating all but the most severe of bag bridges. In cases of severe bag bridging, as for example at discontinuities around tooling elements for bag side stiffeners, we use gum rubber seals either between the inner and outer bags or directly inside the inner bag at the discontinuity to help bridge the gap. Eliminating bag bridging avoids channeling and resin rich areas that would develop at the bridged sites.

We can reduce or essentially eliminate bag mark off with the use of semi-boardy, closely woven, TEFLON impregnated fiberglass materials such as Taconic 7195 or ChemFab CHEMGLAS 1589 as a separate ply and flow media. The low profile minimizes bulk and allows better contouring relative to several layers of glass cloth materials. The uniform, close weave construction of our flow media results in more uniform pressure application across the preform relative to knotty knit materials or bag offset materials. The low profile and weave uniformity of our flow media also makes it possible to use cauls or intensifiers effectively above the flow media to enhance part surface smoothness. The semi-boardy nature of the flow media works to buffer bag and breather wrinkles from transferring to the infused part even in the absence of pressure intensifiers or caul plates. When our flow media is used in conjunction with vacuum thermal cycles, high elongation bags, and gum rubber seals around major discontinuities, mark off is substantially eliminated even on complex parts. Mark off can cause a local weakening of the composite caused by stress concentration.

In our process, an Airweave N-10 breather, between our inner and outer bag has a tendency to bridge over part discontinuities and to fold in areas of excess bulk. To achieve optimum fit between the part and the preform, the breather and the outer bag are placed over the inner bag with vacuum to seat the breather temporarily. The outer bag and the breather are removed. The breather usually is then, cut and darted to allow a perfect fit. The breather, elastomeric materials that form the outer bag, and the breather network can usually be reused.

Therefore, preferred embodiments of our process produce composites with low void contents, minimal surface porosity, excellent thickness control, and high fiber volume. The preferred process provides high vacuum integrity, eliminates resin channeling and poor wave front control. It greatly reduces bag side mark off. It reduces the plumbing complexity and improves manufacture of wide composites. Finally, our preferred process reduces resin waste.

DETAILED DESCRIPTION

Our liquid molding process and system produces excellent quality composite structures at low cost. Simple tooling, minimal capital requirements, batch processing capability, high yields, complex molding capability, and other processing features make it an extremely economical method for composite fabrication. In addition to the process's affordability, it dovetails beautifully with other advanced composite technologies, such as stitching, Z-pinning, electron beam curing, 3-D weaves, and low temperature curing. The preferred process is especially suited for making large structures. Such structures have 150-200 square foot area or more, such as a wing box, a bus body, or a boat hull. The process is also particularly suited for making large structures having very complex stiffened assemblies (common to aerospace to maximize the strength-to-weight ratio), and other unique products that are difficult, if not impossible, to make using known composite processing technologies.

The preferred process of the present invention strives to:

1. Significantly reduce composite fabrication expense by using lower cost raw materials, allowing part integration, reducing capital requirements, lowering tooling cost, and quickening cycle time;

2. Reduce worker exposure to hazardous materials;

3. Maintain high fiber volumes necessary for aerospace composites and achieve the quality associated with current prepreg processing techniques;

4. Enable the development of unique, previously unachievable, advanced composite structures; and 5. Be easily deployed at practically any desired location with minimal investment.

Figure 1:
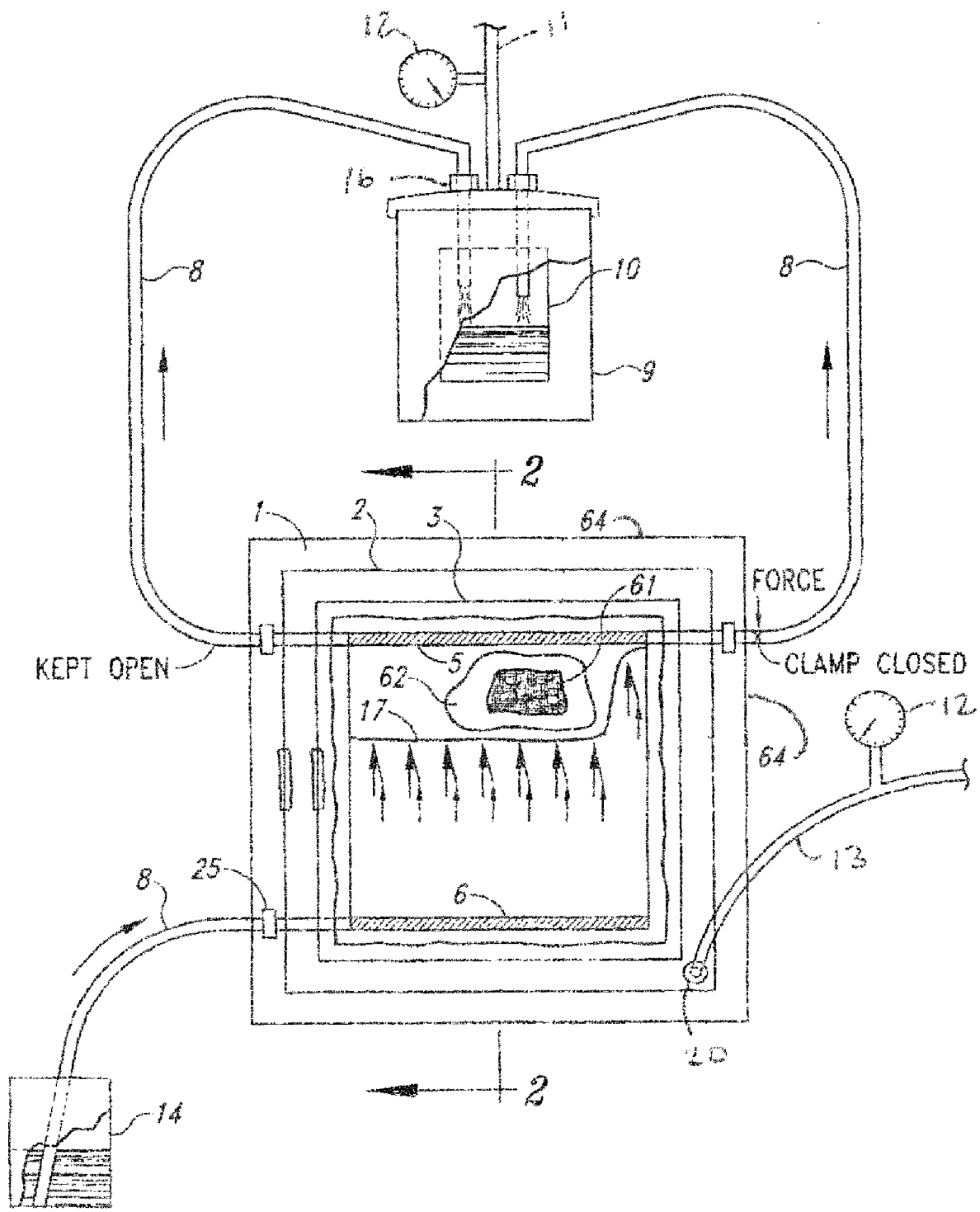
FIG. 1 shows the preferred features of our double bag vacuum infusion system, with the bags partially cut away.
Figure 2:
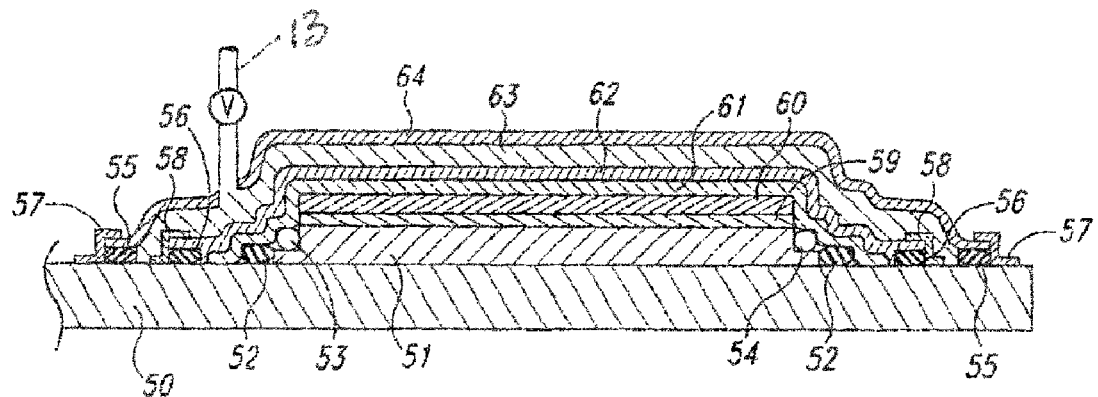
FIG. 2 is a typical cross-sectional view of our double bag vacuum infusion system, taken generally along line 2-2 of FIG. 1.

One embodiment of our double bag vacuum infusion process is illustrated in FIGS. 1 and 2. Advanced processing concepts are shown in FIGS. 3 through 11. A double bag process improves vacuum integrity (desirable for large infusions) and reduces movement of the bagging material away from the preform behind the wavefront (i.e., "relaxation"), as sometimes occurs with a single bag. The basic processing steps are:

1. Tool Selection and Preparation
2. Preform fabrication
3. Bagging and Plumbing
4. Vacuum Dry Out (Optional)
5. Infusion of the Preform
6. Resin Cure
7. Demolding
8. Postcure (Optional)
9. Trim and Inspection We will discuss each of these steps separately in some depth.

Tool Selection and Preparation

Metal, composite, monolithic graphite, plastic-faced plaster, wood, foam, elastomers, modeling board, glass, or other materials for the tooling can provide the necessary vacuum integrity. Leaky tools are unacceptable because air will enter the preform and resin during the infusion step. The resulting parts will have porosity or voids. Materials that are susceptible to leakage must be adequately sealed prior to use. The tools are typically single sided, but matched tools can also be used. Parts can be tooled to the inner moldline or the outer moldline in male or female tools. We prefer female molds tooled to the outer mold line to provide a better surface finish. Molds of this type allow occurring processes for including internal stiffening elements, such as longerons, frames, spars and other features, into the structure with minimal tooling requirements. Outer mold line tooling of this type also allows molding of sills for access doors into the skins at the desired locations.

Tooling details for incorporating internal features into the molded part are typically achieved using blocks of aluminum or other suitable materials that sandwich stiffening elements desired for the preform. These tool details even conveniently allow consolidating and net trimming of some of these preform features before installing the features into the mold. Being able to consolidate these stiffening elements ahead of time eases the preform layup, reduces overall cycle time, and permits precision features to be made without risking damage to the underlying skin.

Split elastomeric hat mandrels, used to produce contoured blades, can be molded in our process. The flat hat mandrels are cast or water jet cut from a slab of rubber. Because the mandrel halves are made from elastomeric material, the flat sections can be forced to twisting contours. With the hat mandrel sections sandwiching the preform material, the assembly can be forced to the skin contour in a way that eliminates gaping. This technique effectively resolves some assembly or joining problems that can be experienced with more rigid, precision machined, metal tooling.

Although at least four times more expensive than similar aluminum tooling, PYREX glass project plates and tooling bars allow direct visual observation of the resin flow front as the preform is being infused. The leading edge of a resin wave front has a low angle tapered cross-section through the preform thickness. The infusion process goes through a cyclic fill and drain process if the flow rate in the vacuum tubes is not regulated to a low rate prior to final tube closure. Glass tooling is valuable for studying the infusion process and learning to control it, because the tooling allows visual inspection throughout the process. Glass tolling, however, is likely impractical for many production processes.

When producing complex co-cures, the internal tooling for the stiffening elements must be precisely located in the mold because of typical interface requirements with joining hardware. Several techniques can be used for precisely locating the tooling, including removable tool stops, pins in offal regions or bolt locations, alignment guides, or high power rare earth magnets for holding the tooling in place. Complex co-cures can be produced with excellent dimensional control of the various part features.

When preparing a tool for part layup and bagging, we apply FREKOTE 700 NC or another suitable release agent to ensure that the molded part will not stick to the mold. We locate the inner and outer bag seals, which must be clean, free from residue buildup from previous runs, and most important, protected from release agent contamination. To protect the inner and outer bag seal locations on the tool from release agent contamination, we apply one-inch-wide, pressure-sensitive tape onto the tool in the seal locations as a mask prior to applying the release coat. Once the base tool is released, the pressure sensitive tape is removed to expose contaminant free seal locations. Solvent cleaning and/or light abrasive honing might be needed for the tool surfaces after several uses.

On high gloss composite tools, we prefer to abrade the tool in the seal locations lightly to achieve better sealant adhesion. We can also use reverse masking techniques, if desired, to abrade the tool only in the bag seal locations.

To minimize swirling patterns in the release coat and possible release agent transfer from the tool to the molded part, the release agent should be hand wiped until all solvent has flashed. Wiping avoids the "coffee spill" effect where release particles aggregate at the edges of the streaks as the solvent flashes off.

Preform Fabrication

Preform Material

Our process can be used with essentially all preform materials, including quartz, PAN-based carbon, pitch-based carbon, glass, silicon carbide, boron, organic, metallic, ceramic, and other fibers. Swirl mats, oriented chopped fibers, chopped fabrics, unidirectional warp knits, traditional bidirectional weaves, tri-axial fabrics, multi-axial warp knits, 2D and 3D braids, 3D woven material, dry or binderized (i.e., tackified) filament windings, tow placed isogrids, hybrids, stitched reinforcements, and Z-pinned reinforcements are just some of the preform possibilities. Sandwich structures with foam, stitched foam, potted honeycomb, film adhesive sealed honeycomb, and syntactic foam cores can also be produced. It may also be possible to infuse structures with properly treated metallic inserts to produce hybrid laminates, such as Boeing's Ti/Gr materials. Perforated or non-perforated etched titanium foils can be interleaved with composite preforms to make high load bearing locations where composites might otherwise fail. High stress composites, such as helicopter bulkheads or pyrotechnically deployed missile wings, are examples where local or isolated titanium interleaving might be used to advantage.

We can also integrate specialized materials into the structure, such as arc sprayed coatings, rain erosion materials, conductive ground planes, conductive knits, resistive cards, appliqus, microchips, MEMS, ceramics, antennas, sensors, or films.

The Need For Preform Binders or Tackifiers

Handling, cutting, forming, and consolidating dry fiber preforms into precision structures can be difficult. The degree of difficulty encountered depends on the starting preform material, the layup process, and the shapes being produced. Some stable preform materials (such as 3D weaves, stitched preforms, multi-axial warp knits, heavily sized fabrics, and tight thin weaves) can be used in simple structures without binders or tackifiers. Other preforms (such as 5HS weaves, 8HS weaves, open plain weaves, unidirectional knits, and chopped oriented mats) usually are stabilized with binders and tackifiers to eliminate fiber loss, to allow automated NC cutting, to create crisp trim lines in tailored layups, and to prevent excessive material distortion from normal handling.

The layup technique also plays a role in determining the need for tackifiers. Filament winding cylinders and/or pressure vessels with dry fibers would result in stable preforms that could be successfully infused. Braided tubes and other shapes would have stable preforms in many cases without binders. Wound or fiber placed isogrids would also likely be stable dry preforms. Hand layup of preforms generally requires binderized material as does complex winding or braiding of noncircular closed bodies.

Almost all preform materials can be used without binders to produce simple flat panels or slightly contoured shells without ply tailoring. Complex shapes such as radomes, tailcones, integrally stiffened shells, deep structures, multi-directionally stiffened components or highly tailored structures require tackifiers for material adhesion to the tooling, enhanced consolidation or debulking, improved trimming, and better dimensional control.

Novel Spray Binderization Materials and Processes

Our preferred binder materials and processes evolved from previous work to produce specialty prepregs using a "Spray Impregnation Process." To add binder to the cloth, the fibrous material is rolled out on tables with an embossed polyethylene liner underneath to prevent contamination. The cloth is generally aligned so that the warp and fill fibers are straight and orthogonal to one another. Binder solution is then sprayed on the exposed side of the cloth, although both sides can be sprayed if desired. The spray can be applied from a hand held gun or from a robotically mounted gun for more precise deposition. The spray parameters are tuned so that fine, uniformly dispersed beads of resin are deposited on the surface of the preform, while attempting to minimize resin wicking into the preform. Having resin beads on the surface of the cloth rather than a uniform distribution of resin in the preform maximizes interply and tool adhesion while minimizing losses in preform permeability, deposition time, and binder content.

Our preferred binder solution is typically a solvated, semi-solid polymer that is compatible with the resin to be subsequently infused into the preform. These semi-solids typically have ambient viscosities between 250,000 and 1,000,000 centipoise. The semi-solid material should have high tack at room temperature or should be able to develop tack when gently heated. Furthermore, the semi-solid should liquefy without significant additional cure when heated during a vacuum, dry out procedure. Liquification of the applied binder with heat allows the binder to wick into the preform when tack is no longer important to achieve appropriate positioning. The wicking action of the binder into the preform while under bag pressure allows further consolidation of the layup. If the resin does not appreciably advance its degree of cure during the heated vacuum dry out procedure or during possible elevated temperature infusion operations, it may be able to bond chemically with or be dissolved into the infusion resin. Binder systems which significantly advance (i.e., either partially cure or begin to crosslink) prior to infusion can only form relatively weak mechanical bonds with the infusion resin. Binders with high degrees of cure have been shown to reduce some composite properties by as much as 10%.

We prefer Cytec Fiberite's 5250-4-RTM BMI (bismaleimide) resin as a binder for 5250-4-RTM BMI infusions. Such infusions, however, require high temperatures which increases their difficulty. We prefer CIBA's M-20 cyanate ester (CE) semi-solid resin as a binder for infusions with cyanate ester materials such as Bryte Technologies EX-1545, EX-1545-1, and EX-1510. For infusions with low viscosity epoxy based resins, we prefer epoxy based semi-solid binders such as PR 500, 3501-6, 3502, 977-3 and FM 300.

A typical catalyzed formulation of the M-20 cyanate ester binder solution includes:

| M-20 semi-solid | 78.597% by weight |
| Cobalt Acetyl Acetonate (CoAcAc) | 0.086% by weight |
| Dinonyl Phenol | 1.572% by weight |
| MEK 1 | 9.745% by weight |

To make the M-20 binder solution, the CoAcAc, dinonyl phenol, and a small amount of MEK is mixed for several hours with a magnetic stirrer in a sealed container. The extended mix time is required to dissolve the CoAcAc into solution. This organo metallic salt has relatively low solubility rates and requires significant time to dissolve. The semi-solid M-20 resin is then heated in a convection oven to between 120 and 150.degree. F. At these temperatures in the uncatalyzed condition, the M-20 becomes fluid enough to dispense easily from its container with essentially no resin advancement in the degree of cure. Once the resin is dispensed, the bulk of the MEK solvent is then added to the M-20 resin. The resin is dissolved into the MEK in a sealed pneumatic mix pot that prevents solvent flashing. Once the M-20 is uniformly dissolved, the catalytic solution of CoAcAc, dinonyl phenol, and MEK is added to the base mix. The solution is then mixed in the same sealed container for several hours to blend and further dissolve catalyst while preventing solvent flash. The resulting solution is dark green and has a shelf life of at least one month, if it is stored sealed at room temperature without exposure to moisture. Failure to heat dispense the M-20 from its container can result in crystallization of the binder solution. Crystallization is easily detected by observing that the solution is a light pea green color.

A simplified and possibly improved M-20 binder solution appears technically feasible. Uncatalyzed M-20 cyanate ester can be thermally cured at temperatures above 250.degree. F. Since the cyanate ester infusion resins are typically cured at 350.degree. F. and higher temperature postcures are often required, M-20 cure could be expected in the absence of any catalyst. The catalyst used for the cyanate ester infusion resins can also probably catalyze the M-20 binder resin since similar chemistries are involved and the ratio of infusion resin to binder resin is relatively high. Infusion resin catalysis of the binder resin appears likely since the infusion resins can dissolve the small M-20 resin islands and significant static mixing occurs as the infusion resin percolates through the preform. The combination of thermal cure of M-20 and infusion resin catalysis of the binder suggests that the binder solutions can be formulated without the addition of the dinonyl phenol and the CoAcAc catalysts.

Eliminating these components from the binder solution has several potential benefits. The binder solution can be made significantly faster (in {fraction (1/10)}.sup.th the time, perhaps) than it currently takes to produce the catalyzed version. The resulting solution is likely to have a much longer pot life, perhaps as much as 6 months. The binderized preforms should have extended working times at room temperature relative to the catalyzed version and longer shelf lives in storage. The more latent material would also tend to advance less than the catalyzed version when subjected to thermal debulk cycles or thermal, vacuum dry out processes. The reduced degree of cure means the binder can more easily mix with the infusion resin. Low degree of cure binders should never lock the preform in a poorly consolidated condition that would prevent high fiber volumes from being achieved during the DBVI process.

A typical formulation for the 5250-4-RTM BMI binder solution is:

| 5250-4-RTM BMI Resin | 80% by weight |
| MEK | 20% by weight |

To formulate this binder solution, the 5250-4-RTM BMI resin is heated and dispensed typically from a 5 gallon can using a Graco hot melt dispenser. The resin is heated to between about 230.degree. F. and 270.degree. F. prior to dispensing. At these temperatures, the BMI will slowly advance over a period of approximately 3 hours. Since the dispensing operation can be completed in less than 15 minutes, insignificant resin advancement occurs. Insignificant advancement also occurs during the thermal vacuum dry out cycle. Once the resin is dispensed into a vacuum mix pot and has cooled slightly, MEK solvent is added to the resin. The resin is dissolved into the solvent carrier using a pneumatically driven stirrer in a sealed container. Pneumatic stirring is used to avoid potentially explosive conditions that could result with electric mixers. Once the resin is dissolved, the BMI binder solution is ready for use.

Another approach for making 5250-4-RTM BMNI binder solutions is to dispense resin in a 1 gallon can or equivalent using the hot melt dispense technique. The resin is then cooled to room temperature for resolidification. Ceramic or stainless steel balls are then added to the can. The can is sealed and placed on a rolling balling mill or in a paint shaker for a short period of time. The impact of the balls causes the brittle semi-solid resin to pulverize into a fine powder with a much higher bulk factor. Milled resin can be kept sealed and frozen in the can until needed for making binder solution or can be used immediately. Increasing the surface area of the resin allows the MEK solvent to solvate the binder resin more quickly than is possible with simple pneumatic mixing of large sections of bulk solidified resin with solvent. Once the solvent is added, little additional mixing is required. The solution can be filtered through disposable filters to remove the milling balls and any other possible foreign objects.

Although the formulations given specify the use of MEK for dissolving the resin, other solvents or diluents can be used such as acetone, N-methyl-pyrrolidinone (No), methyl isobutyl ketone (MIBK), water, reactive diluents, and others. Diluent changes can be used to modify spray characteristics and increase room temperature tack of sprayed, low tack, semi-solid binder resins. Solvent retention in the sprayed binder can be achieved through the use of lower volatility solvents (i.e., solvents with lower room temperature vapor pressure) or solvents which have higher affinity for the given resin material. The solvent retained in the applied binder plasticizes the resin and typically increases room temperature tack characteristics of low tack resins. The solvent in the binderized preform materials can be subsequently removed prior to resin infusion during the heated, vacuum dry out procedures.

The semi-solid polymer contents in the binder solutions will be typically in the vicinity of 70-90 wt %, and, generally, 80 wt %. Spray viscosities range between 100 and 500 centipoise. Binder solutions are considerably thicker than many spray materials. The higher viscosities and the high solid contents work to maximize transfer efficiencies, achieve droplet dispersion rather than fine misting, minimize solvent emissions, and prevent resin migration and wet out of the cloth. As the solutions travel from the gun to the surface of the preform, solvent (plasticizer) flashes and the remaining resin becomes more viscous since it has less plasticizer. The thick droplets cannot wick appreciably into the cloth when they make contact. Transfer efficiencies are on the order of 50-60% with typical air assisted airless spray processes. These efficiencies can potentially be increased over 90% with the use of electrostatic liquid spray technologies.

The binder contents on the cloth typically range between 1 and 10 wt %, although 3-7 wt % is more typical. Lighter weight cloths, such as 5HS, generally need higher binder content than thicker preforms, such as multi-axial warp knits, because the tack is more related to surface area than volume or weight of the preform. Preforms with a binder content in excess of 15 wt % can experience wet out and create permeability problems during resin infusion.

Preform materials are typically binderized in sheets. Once the majority of the solvent has flashed after being applied, embossed polyethylene film is then placed over the binderized preform. The polyethylene sheets can be cut manually with templates or with automated, numerically controlled knives on large vacuum beds to produce the required plies. The binderized material can be manually spooled on large diameter cardboard tubes, sealed with Mil-B-131 bags, and placed in a freezer maintained at a temperature of about 0.degree. F. Prior to removing binderized material from Mil-B-131 freezer bags for use, the material must be warmed to ambient conditions to prevent water from condensing on the binderized preform.

Individual plies of material rather than sheets of preform can be binderized if desired to conserve binder. Precise fit for the plies sometimes can be better obtained in layup molds using dry cloth without binder. Binder can be applied after molding to assist adhesion to the underlying mold or plies. Using dry cloth is particularly helpful where flat patterns have not been developed and trial and error assembly to close tolerance is required.

The binder materials and processes were developed principally for offline spray application on preform materials. However, the binder materials and spray application process can be used during preform layup. If additional tack is needed in a given area, needed binder can be applied locally. First ply preform layups on contoured tooling, ply splices with butt joints, embedded sensors, and holding stiffener details in position are examples where on line, in mold application of binder is helpful. In dry wound or braided structures, the preform could be periodically tackified on the mandrels as the fibrous material is being built up. Doing so would eliminate the need to apply binder to individual continuous tow material and would allow the tow material to be used without freezer storage, shelf life limitations, or gumming of delivery equipment. Tow breaks on towpreg spools can be common with excessive tack between the spool wraps. Some lesser degree of breakage might also be expected with binderized tow on spools. So by applying binders to the tow material on the mandrel rather than to the tow packaged on the spool, fiber breakage can be avoided while still providing preform stability. Tow gaping voids experienced with towpregs can be eliminated when dry or binderized wound or braided preforms are infused using the process of the present invention. Difficulties associated with wet winding and wet braiding are also avoided.

For robotic spraying of the binder onto the preform (FIG. 5), the binder solution is charged to a pressure pot 501 with a disposable polyethylene liner. The lid 502 is installed and clamped pressure tight. A fluid delivery hose 503 is connected to the pickup tube 504 inside the pressure pot. Pressure regulated nitrogen or dry air is injected through line 505 to pressurize the pot and force resin into the pickup tube and line. The pressure pot has pressure relief valves to prevent over pressurization and to bleed pressure from the pot for removing or adding resin. A regulator is installed near the gun 506 to control the fluid pressure being delivered. Controlling the fluid pressure at the gun controls the volumetric flow rate through the gun's spray nozzle. Installing the regulator near the gun eliminates any pressure drop influence from hose length, hose diameter, or robot arm height. Nozzle control is also needed to control flow rates. Slight manufacturing variances in the nozzle orifice can result in different liquid flow rates. Nozzles of a given type are examined and screened for uniformity and are used exclusively for spraying the tackifier resin. Nozzle control and fluid pressure regulation at the gun work in conjunction to give consistent and repeatable volumetric flow rates through the nozzle. The air assist atomization pressure through line 507 also is regulated and controlled to give consistent spray dispersion from the nozzle.

The robot 508 carries the gun and is programmed to traverse across the preform with a constant offset from the preform 509 and a controlled velocity. The spray from the nozzle typically has a flat fan pattern. Most of the spray material is deposited at the center of the fan with tapering amounts delivered at the fan edges. To compensate for this nonuniform distribution in the spray fan, the robot is programmed to overlap adjacent passes to even out the distribution. Typical pass indexing is ¼ fan width.

Coupling all the controls together results in consistent, uniform binder deposition on the preform. Quality control tests are performed at the startup of the process to insure the binder is delivered as desired. Noise variables can influence the binder contents realized. To compensate for noise, the robot speed can be adjusted. The robot can produce sheets of binderized preforms up to 60 inches wide and 20 feet long using an appropriate spray booth, robot arm reach, and robot transverse movement.

Large volumes of rolled or spooled broadgood preform materials could be economically binderized. A system with feed and take up rolls, a spray zone, and a solvent flash zone can efficiently produce binderized materials at low cost with poly or paper backed liners or possibly no liners.

Co-cured composite structures need to increase the pull off and shear off strength values between the stiffening elements and the underlying skin. With high strengths, "chicken fasteners" are usually not required. Eliminating fastener installations results in significant cost reductions. High peel strength adhesives placed between the skin and the stiffening elements maximize skin-to-stiffener strength values. Tough, high peel strength binder resins likely can be developed for localized application at these critical zones. The binders would emulate the effect of the film adhesive but provide the necessary permeability for infusion resin flow.

Most binder technologies currently use powdered resins that lack room temperature tack. Although tacky when heated, the pot lives of these binders are generally short at elevated infusion temperatures. The binders can advance so far in their cure that they cannot chemically bond with or dissolve into the infusion resin, so the primary bonding mechanism tends to be mechanical rather than chemical. Powder binders do not lend themselves to uniform distribution on the preform. Powder adhesion to the preform can be relatively weak resulting in material loss and foreign object powder debris in the layup area. Furthermore, it is difficult to control the actual quantity of powder deposited. Electrostatic powder deposition applies excess powder that must be shaken off the preform before use. Powder depositions trend toward a natural binder content level that is difficult to alter to more desired levels. In many cases, the low flow characteristics of these powdered systems can impede the consolidation required to achieve "aerospace grade" fiber contents. Low room temperature tack, low adhesion to the preform, FOD potential, poor chemical bonding, inadequate binder content control, difficult automation, preform consolidation restrictions and other conditions make powdered binders much less desirable to use. We prefer binder solutions and liquid binder spray techniques.

Preform Assembly and Build

In the hand layup process, a finished preform typically consists of multiple layers of fibrous materials cut, stacked in the desired orientations, and debulked. Preform subassemblies can be manufactured offline for later installation in the final preform. The preforms can be assembled with dry fiber materials or binderized materials for improved integrity and consolidation. Finished preforms can be made from dry fiber materials, binderized fiber materials, or a combination of dry and binderized material depending on the part requirements. The preforms can also incorporate a wide variety of other materials including foams, honeycomb, prepregs, film adhesives, metals, ceramics, sensors, and other specialty materials.

Generally speaking, more care must be exercised when handling dry or binderized preforms relative to traditional prepreg materials. On the other hand, dry or binderized preforms typically require fewer vacuum debulking steps than prepregs. For simple geometries, the entire stack of collated preform material layers can be vacuum debulked once at room temperature. As the part complexity, contouring, features, and thickness tailoring increase, additional vacuum debulking steps are required during the preform collation.

Binderized materials are vacuum debulked at room temperature to produce "soft binder preforms." Typically, soft binder preforms must remain on the forming tool for shape retention, but sometimes can be precision trimmed for net molding operations. The consolidated "soft binder preforms" tend to have some springback and tend to expand in thickness slightly when removed from a vacuum bag. The amount of "springback" after consolidation is dependent on the binder tack, the binder content, and other factors.

Binderized materials can also be vacuum debulked at elevated temperatures to produce "semi-rigid preforms." The stiffness generated during the heated debulk results from binder advancement in degree of cure and/or solvent removal. Having additional stiff-ness and stability, these semi-rigid preforms allow simplified precision trimming. Details can be removed from the supporting tooling if handled carefully. Fewer debulking tools are needed to mass produce dimensionally stable semi-rigid preforms that can be stored temporarily. The semi-rigid preforms remain permeable and can be effectively resin infused.

The final collated preform should, in most cases, be debulked prior to the bagging and plumbing operations required for resin infusion. This final preform debulk allows the layers to flatten and grow in plane without edge seal interference, and provides a better starting point for layup of the inner bag components.

Bagging and Plumbing

Our preferred 'double bag' process results in superior vacuum integrity. The inner bag seal is covered by the outer bag. The inner bag can not peel away from the inner bag seal as easily because it is locked into position by the outer bag. Furthermore, the inner bag is completely isolated and enclosed to protect it against damage. If a minor leak develops in the inner bag, the system will continue to perform since vacuum within the outer bag will prevent air from entering the inner bag.

To achieve even greater vacuum integrity, both inner and outer bag seals generally are taped down with pressure sensitive adhesive tapes to prevent bag peel. Heated, vacuum dry out process is sometimes used to cure the gum rubber seals partially offline prior to the liquid infusion. Precuring toughens the seal. If a leak is detected prior to infusion, it can easily be repaired without affecting the part. A seal failure may occur unexpectedly during the initial heating when the gum rubber softens from the heat and before it has had sufficient time to cure significantly. Using a heated, vacuum dry out process before infusing the resin, the tacky gum rubber seals are tested and cure bonded to the bags so that seal failure is unlikely to occur during the liquid infusion. The curing of the elastomeric seals also makes them less susceptible to resin attack and possible contamination of the resin and preform. Besides improving seal integrity, the heated vacuum dry out process serves to remove any volatiles in the preform, seats the bags, and improves consolidation prior to the infusion step.

Simplified plumbing to supply resin and vacuum reduces vacuum leaks. A preferable approach for porting is to deliver resin and vacuum to the part with tubes that pass through the gum rubber bag seals. With through-the-seal tube delivery, special fittings are not required and no tool perforations are required which could limit tool use for other applications. A variety of tubing can be used. The tubing, however, must be chemically inert, able to withstand the thermal processing, not collapse under vacuum, and provide an effective seal with the gum rubber sealant it passes through. The tubing should also be pliable enough to be externally clamped repeatedly without cracking. It should have sufficient, repeatable memory to recover to an open position after external clamps have been removed so that in line valves and additional fittings are not required. The tubing should be clear (optically transparent) or at least translucent to allow direct observation of the resin flow. Polyethylene, polypropylene, nylon, and TEFLON tubing meet most of the requirements, but we have found TEFLON tubing to be optimal for handling higher temperature resins that cure at 350.degree. F. or above. TEFLON tubing includes ETCFE, PTFE, FEP, and PFA types of fluoropolymers. In our improved process, an economical chemical etch of the TEFLON tubes maximizes adhesion of the gum rubber seals to the tubes. Also we elliptically flatten the tubes in the seal locations using a high temperature thermal process and a gauged clamping tool to minimize possible leaks resulting from tube line pressures cutting through the soft gum rubber seals.

External stresses on the resin and vacuum porting devices can also cause leaks. These stresses can be introduced during handling, clamping, or valving operations. Our preferred process uses strain relief devices applied to the tubing as they exit the outer bag seal to protect the critical seal-to-tube interfaces from excessive stress FIG. 6. Not even abusive tube handling will degrade the seal integrity.

Some liquids (i.e., resins) infused into the preforms are sufficiently reactive to attack the inner bag aggressively when in direct contact with the bagging materials. To prevent such attack and subsequent loss of vacuum, we place an inert barrier film, such as FEP A4000 or WL5200 (from Airtech Int'l.) between the flow media and the inner bag. Resin containment in the preform by gum rubber seals also simplifies layup of the barrier film and prevents inner bag attack at the perimeter of the inner bag where it is unprotected with the barrier film.

The high vacuum integrity achievable with our process helps to consistently produce composites with low void contents, minimal surface porosity, excellent thickness control, and high fiber volume.

To make a simple flat panel, the vacuum bag debulked preform is optimally bagged and plumbed as shown in FIGS. 1 and 2. Bag sealant 2 and 3 for the inner and outer bags is placed on the tool 1 in areas masked from release agent to ideally separate the bags about 7.62 cm (3 inches). Likewise, inner bag seal and edge dam or preform separations should also be about 7.62 (3 inches). This separation protects inner bag 62 (FIG. 2, 8, 10, 11) from possible bag attack with chemically aggressive resin systems when used in conjunction with a barrier film 61. Many gum rubber bag sealant options, such as Scheene Morehead 5127, are commercially available. The paper backing on the top of the sealant is left in place as a protection from contamination until the bags or tubing is installed. Care is taken when installing the sealant to avoid trapping air between the sealant and the tool. The sealant is rolled with the top backing paper in place to improve seal seating while avoiding seal contamination. Sealants must be used within allocated shelf life and kept from moisture or solvent exposure prior to use. Old sealants may have insufficient tack and may foam during part cure because of absorbed moisture or solvents. Both phenomena reduce the critical seal integrity required.

A finely woven, porous peel ply material 59 is laid on the debulked preform 51 (FIG. 2). The peel ply material can be polyester, nylon, glass coated with a suitable release agent such as FREKOTE, or TEFLON-impregnated fiberglass. Typically, TEFLON-impregnated fiberglass, such as CHR3, is used, because it has superior release characteristics and a fine surface finish. Peel ply materials are generally less than 0.005 inches thick and are more typically 0.002-0.003 inches thick. The peel ply is generally terminated approximately ¼ inch from the two sides of the preform that run parallel to the flow direction, although other offsets are possible. The peel ply on the resin supply and vacuum pull off ends of the preform can be flush with the ends of the preform or can extend slightly beyond the end, in which case they are tucked under or over the spiral wound springs 5 and 6 (FIG. 1, 8, 10).

Flow media 60 is then laid over the peel ply 59 (FIG. 2). The flow media should be a low profile material that has high, uniform permeability relative to the preform, such as open weave fiberglass, screening material, woven metallic screens, chopped glass mats. The media should drape for contouring, have minimum contamination potential to the infusion resin, provide adequate stiffness to prevent bag mark offs on the part, and survive the required cure cycle. TEFLON-impregnated, open weave fiberglass materials such as Taconics 7195 or ChemFab CHEMGLAS 1589 perform particularly well as a flow media material. These TEFLON-impregnated fiberglass materials are approximately 0.020 inch thick, have a uniform woven structure, are chemically inert, and are resistant to temperatures up to 600.degree. F. Their somewhat boardy (stiff) nature allows contouring and bending, but also serves to prevent bag mark off. Their permeability helps to control the infusion resin wave front and prevents trapped void formation during the infusion, but can create problems for infusions with resins having very high viscosities or limited working times before thickening. To increase the permeability of the media while still retaining the uniform feed and reduced mark off characteristics, higher permeability materials can be placed over the TEFLON-impregnated fiberglass. One option is to use coarser Taconics 8308 or simply another of Taconics 7195 over the Taconics 7195 to create a more permeable flow media combination which will dramatically speed infusion rates and allow processing of more viscous resin systems.

The flow media is typically placed directly over the peel ply and is tucked on the ends under the spiral wound springs 5 and 6. Tucking allows good resin feed coupling from the spring into the flow media and also allows the spring to be easily removed from the part after cure without causing edge delaminations. Flow media can be terminated on the preform prior to the vacuum pull off spring to straighten the wave front and to correct minor resin channeling. The resin velocity of the wave front is reduced when it encounters the flow media dropoff because of the higher drag. This velocity reduction in the channeled areas allows lagging portions of the wave front still in the flow media to catch up with the channeled zones so that the wave front proceeds uniformly through the flow media and approaches the spiral wound spring at the same time.

Spiral wound steel springs (5 and 6, FIGS. 1 and 53 and 54, FIG. 2) used for resin feed and pull off from the ends of the preform, are typically placed on the long edges of the preform to minimize resin flow length through the preform. The springs are usually placed immediately adjacent to the edge of preform, but can also be placed on top of the preform at the ends if more offal trim provisions are given for the final part. The springs are substantially the same length as the edge of the preform. Because lubricants are sometimes used to assist in winding the springs and to prevent corrosion, they must be cleaned with solvent, like MEK, in a rinse tank; vapor degreased; or alkaline cleaned to prevent possible contamination. The springs can be annealed or made from softer metals such as aluminum or copper.

Because resin pull off should not exceed the resin supply, larger, more loosely wound springs are typically used on the feed end of the preform than on the vacuum end. Some typical spring specifications for feed and vacuum ends of the preform are:

| | |
|---|---|
| Feed | ⅜ in. O.D., 0.032 in. Diameter Spring Steel Wire, 10 Wraps/in., Heat Treated |
| Vacuum | ¼ in. O.D., 0.032 in. Diameter Spring Steel Wire, 15 Wraps/in., Heat Treated |

Steel springs have been found to withstand the cure temperature requirements and do not collapse under the vacuum bag pressure. The spiral configuration of the resin delivery and pull off devices produces gentle contoured preform edge. Drilled tubing, spiral cut tubing, spiral wound metallic ribbons, or small chains can be used instead of springs. Because of possible runaway reactions with catalyzed thermoset resin in bulk, the allowable diameters of the springs may be constrained from growing beyond approximately ½ in. OD.

After the feed and vacuum pull-off springs have been installed, the preform 51 (FIG. 2, 8, 10, 11) is preferably sealed along the edge with a gum rubber sealant 52. The gum rubber should be deformable under bag pressure but yet have relatively little flow to prevent appreciable migration into the preform and springs. The sealant typically used is AirDam 1B from Airtech International. This sealant is ⅜ inch wide and approximately {fraction (3/16)} inch thick. Fine, milled fiberglass is incorporated into the sealant for flow reduction. In some cases, we use the higher flow, AirDam I sealant. The sealant tape is stacked in layers in long strips to approximate the thickness of the preform. Excessive sealant thickness may cause the inner bag to bridge the preform around its periphery.

Insufficient sealant thickness may in extreme cases cause edge tapering in the preform from localized bag stresses.

Once stacked in strips to the correct thickness or height, the two sides and top of the sealant is wrapped in an inert, lightweight, stretchable, release film such as A4000 or Wrightlon 5200. The exposed bottom allows the sealant to seat and to seal against the tool 50 (FIG. 2, 8, 10, 11). With only three sides on the sealant covered with release film, it is able to expand outward to form a tight seal with the irregular sides of the preform. The intimate contact of the release film covered seal with the sides of the preform prevents resin channeling during the infusion. The release film constrains excessive sealant flow, prevents contamination of the infusion resin and preform with sealant, and protects the tool-to-edge sealant interface from possible resin attack.

A continuous strip of sealant covered with a release film is laid tightly around the periphery of the preform to contain the infusion fluid until it is solidified during cure. Resin containment is essential to prevent resin bleed and loss of hydrostatic pressure on the part, especially between the time that the vacuum and supply tubing is clamped and cut and the resin ultimately gels or solidifies.

Sometimes the inner bag 62 or the barrier film 61 fits around the preform assembly to prevent channeling and provides the necessary fluid containment without the edge seals. We prefer using gum rubber edge seals, particularly for thick preforms having large bag discontinuities at the edges, when the viscosity of the infused resin drops significantly during cure, or for fluid containment in inclined or vertical infusions.

Figure 3:
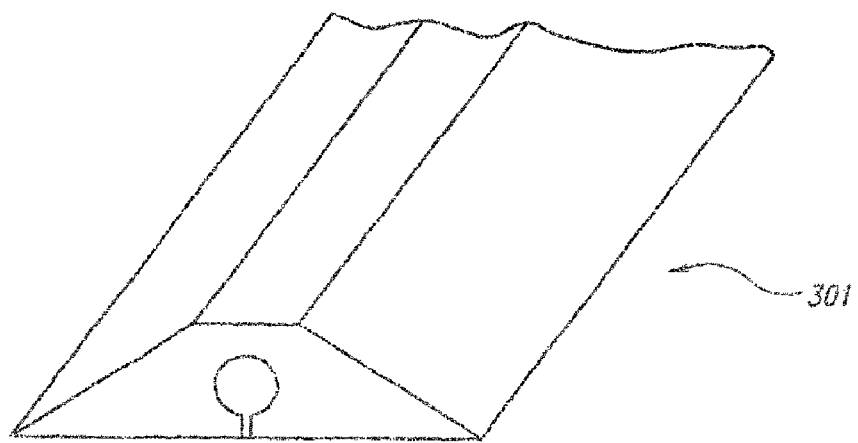
FIG. 3 is an isometric of a preferred conformal tube fairing.

Our process uses constant cross section, elastic conformal tube fairings (CTFs) 301 CTF 301 throughout with wide or large stiffened preforms. The low profile of the tapered CTFs minimizes bagging problems and potential mark off especially when placed over a semi-boardy flow media. The CTFs can be molded, cast in slabs, and water jet cut to create the desired bevels or can be extruded to shape in simple molds or dies. Since these CTFs are made from elastic materials, flat general purpose CTFs can be made to fit most contoured skin surfaces. A typical, preferred CTF 301 is shown in FIG. 3.

Figure 4:
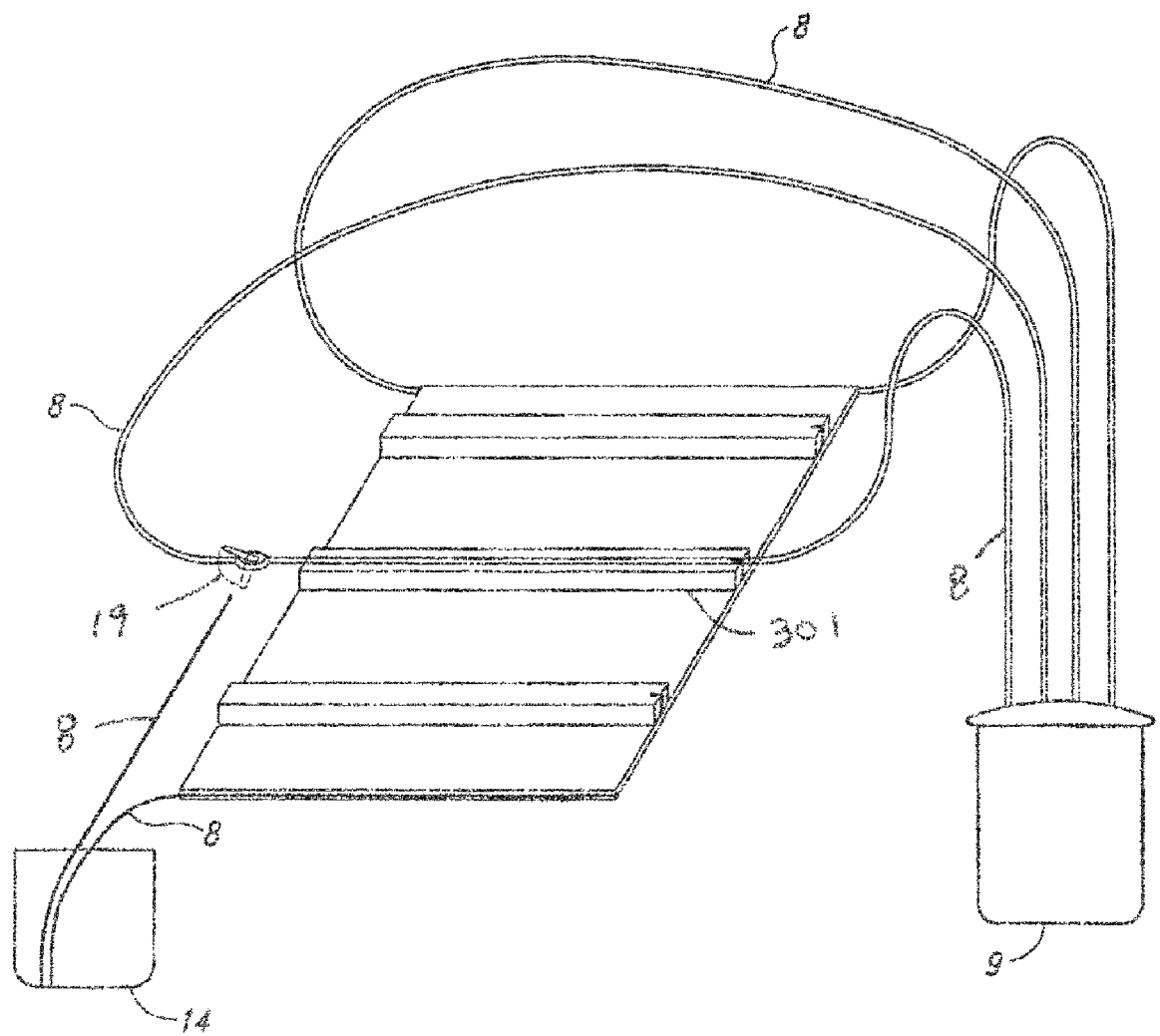
FIG. 4 illustrates a system for converting a vacuum line into a feed line without introducing air into the infusion.
Figure 5:
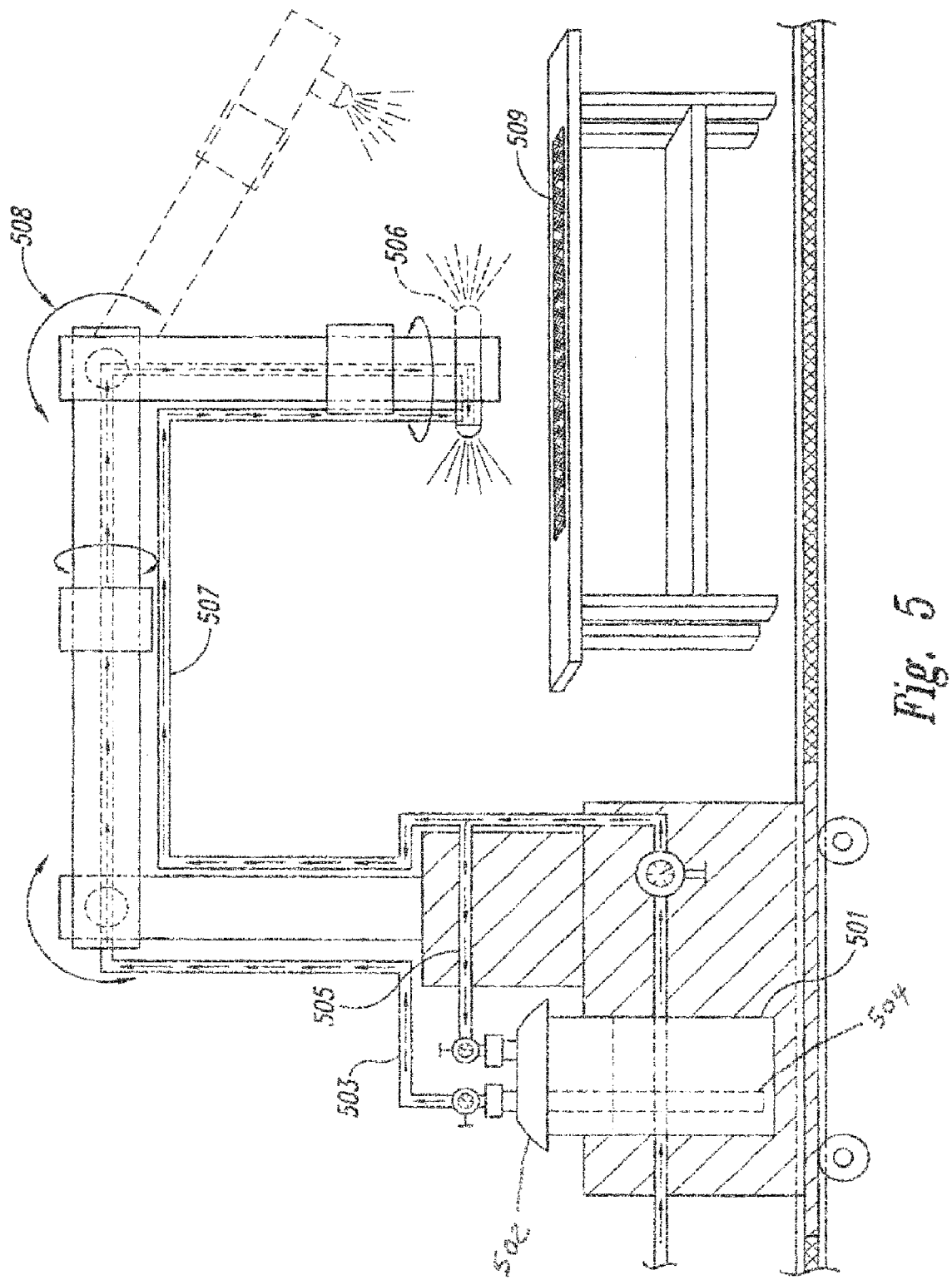
FIG. 5 is a robotic spray system for applying a binder or tackifier to a preform.
Figure 6:
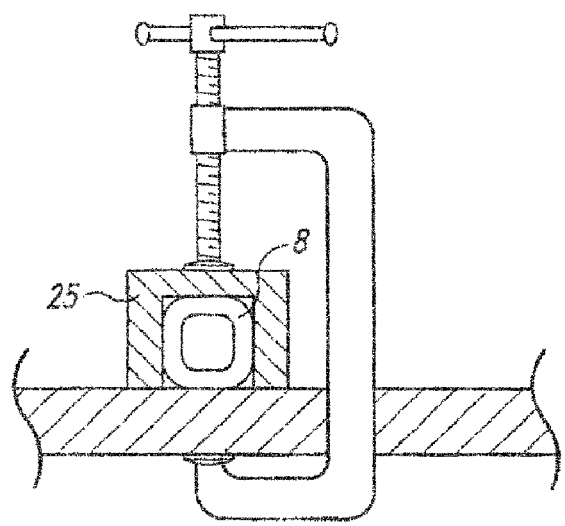
FIG. 6 is an isometric of a preferred clamp for restraining the vacuum tubes to assure vacuum integrity.

To augment the CTFs in producing wide assemblies, as the infusion proceeds, we convert vacuum lines into feed lines without introducing air into the bag and without creating mark off. A vacuum tube mounted on a stiffener, for example, can be used to infuse that stiffener and thereafter be converted into a feed line for the next infusion bay or section (FIG. 4). This conversion between feed and vacuum uses a T or Y fitting 19. One leg of the T connection is connected to a resin supply, but can be clamped or closed with a valve while the other leg is left open and connected to the vacuum drop out tank. Once resin begins to fill the vacuum line and clears the T fitting with no bubbles, the tube exiting the bag is closed and the leg to the resin supply is opened. The supply tube fills with resin and purges air from all tubing. Once the tubes are filled, the vacuum line leading to the drop out tank is closed and the tube exiting the bag is opened allowing a new resin supply to feed the preform.

Tubing 8 is cut to the required lengths to connect the feed and vacuum pull off springs to the resin container source 14 and the vacuum drop out tank 9 (FIG. 1 and FIG. 2), respectively. TEFLON tubing made from FEP, ETCFE, PTFE, or PFA can be used for resins that cure between 250.degree. F. and 600.degree. F. Lower cost tubing is available for lower temperature exposures.

One end of each tube 8 is dipped in an etchant such as (Tetraetch from Gore Industries). The etchant strips flourine from the TEFLON to create a chemically active surface that will adhere aggressively to the sealant. After the etchant dip, the tubes are rinsed with water and dried. The etched tubes remain chemically active for extended periods of time and can be stored indefinitely if kept dry in sealed bags away from ultraviolet light exposure. Tubing inner and outer diameters for both the feed and vacuum lines are typically 0.25 inch and 0.375 inch, respectively, but other diameter combinations are possible. Smaller inside diameter feed tubes may restrict resin feed to the preform. Larger ID tubes are more expensive and may result in uncontrolled exothermic conditions due to excessive resin bulk. Wall thickness of the tubing can be reduced, but tube memory for external valving suffers. Thin walled tubes collapse at elevated temperatures.

Once the tubes have been etched, distances from the end of the springs to the bag sealant locations are determined. The tubing is elliptically flattened in 1 or 2 inch wide bands where it will interface with sealant. Flattening the tubes in these areas increases the sealant support area and results in less cutting action through the sealant when the preform is bagged and the sealant softens from heating. Heating occurs throughout the process during vacuum dry out, infusions, and cure. The tubes are heated to about 600.degree. F. or higher with a standard heat gun and then compressed in a vise. The vise has a stop set at a desired thickness to prevent tube collapse and to flatten the tubes repeatably to the same thickness. The tubes can be quenched in water after flattening and dried or air cooled to room temperature.

The etched ends of the tubes are preferably attached to the springs 5 & 6 with pressure sensitive adhesive tape wraps, such as FLASHBRBEAKER, KAPTON or other high temperature resistant tape. On the vacuum end, each spring is inserted a short distance into the joining tubes given the mating diameters. The cut ends of the feed spring are bent toward the center of the spring to prevent possible bag puncture. When the tubes and springs are assembled, the backing paper over the bag seals in the tubing locations is torn and peeled back to expose the sealant. The tubes and springs are seated directly over the bag sealant.

Tube strain relief devices 25 are installed. These U-shaped channels 25 (FIG. 6 and FIG. 1) have a channel depth less than the outside diameter of the associated tube to create a slight interference fit. Tube friction and the large cross-sections of the tubes outside the channels prevents movement in the critical bag seal locations.

We usually position a chemically resistant, lightweight, stretchable barrier film 61, FIG. 2, 8, 10, 11, such as Airtech International's A4000 or Wrightlon 5200 FEP TEFLON film, over the assembly to provide additional protection for the inner bag 62 from resin attack, bag punctures, or resin leakage past the edge seal for infusions that occur at temperatures below about 350.degree. F. Such a film covers the entire preform layup and edge seal and runs up close to the inner bag seal. For lower temperature cures, polyethylene or polypropylene films can be used.

If the resin is very aggressive, it can move beyond the edge of the protective film and attack the bag unless additional strips or frames of film are installed to the inside edge of the inner bag seal 56, FIG. 2, 8, 10, 11. These film strips typically overlap the barrier film 61 by 1-3 inches to restrict and to narrow the flow path for the resin to reach the inner bag 62.

The inner bag 62 generally is a disposable or consumable film or elastomer. For long production runs, however, especially of complex structures, conformable, premolded, reusable elastomeric bags made from silicones, fluorosilicones, Fluorel, nitrile rubber or other elastomeric materials may be preferred. The bag 62 should be flexible and have high elongation capability with relatively low modulus to simplify bagging complex parts that can be vacuum formed around the preform even where bridged. Bag bridging can occur over the preform at discontinuities. A low modulus reduces localized bag stresses on the preform which otherwise can cause tapering, distortion, or preform damage. Shaping the bag to conform with the contour of the preform minimizes resin rich zones in the finished parts, resin channeling, and edge tapering from bag induced stresses. Although stiff at room temperature, the film may become sufficiently flexible when heated for vacuum dry out, infusion, or curing. Standard nylon bags for prepreg material processing at 350.degree. F. will work, but are not optimal because of their relatively low ultimate elongation (200-300%) and high stiffniess. STRETCHLON 700 polyester and STRETCHLON 800 nylon bagging films from Airtech International are superior, because they can stretch over 500% and are more flexible than the standard nylon films. A VACPAC polyurethane film from Richmond Products is effective for low temperature cures below 160.degree. F., because it has an extremely low modulus at room temperature and an ultimate elongation approaching 1000%. For cures up to 600.degree. F., special FEP based bagging films, such as ChemFab's VB3, can be used instead of polyimide based films such as KAPTON or TBERMALIMIDE. This FEP bagging material, when etched on one side, has elongation over 500%.

For bagging of complex shapes, we stretch disposable films on master tools at elevated temperatures. These stretched bags are easy to use and are superior to reusable, molded rubber bags in producing complex hardware.

Reusable, molded rubber bags are generally produced from gum rubber sheets that are spliced, seamed together over a master tool, and heated to cure. The master can have patterns embedded or embossed on it to create channels or flow features directly into the bag, in the same manner as Seemann suggests. Typically these rubber bags are treated to allow resin release after cure, to reduce bag attack, and to improve sealant adhesion in selected areas, especially around the edge. Composite materials can be incorporated into the bags in an attempt to control shrinkage after cure.

Rubber molded bags are significantly more expensive than disposable bagging films, but the bags tend to degrade faster than one would expect. Release liners are often attached to the molded rubber, but they can disbond and create spider wrinkles on the bag molding surface. Seam failures or bag tears can occur.

Making the master mold can be difficult. It must be sized to accommodate the high bag shrinkage that will occur after cure. Nevertheless, the bags continue to shrink over repeated cure cycles resulting in poorer and poorer fits with the preform. The assembly problem is compounded because the rubber bags have a much higher stiffness and loading on the relatively unstable preform than disposable film bags. Force fitting the bags can actually result in preform movement or damage. Properly cared for, the bags can only withstand about 100 cure cycles at 350.degree. F., but they often fail in less than 10 cycles.

The inner bag 62 is cut oversize relative to the area contained inside the inner bag seal 56. The protective paper is removed from the top of the inner bag sealant. The inner bag is seated on the sealant. Excess material outside the periphery of the seal is trimmed and then a pressure sensitive tape 58 (FIG. 2), such as FLASHBREAKER 1 from Airtech International, is used to tape the bagging film to the tool 50 to increase vacuum integrity and to minimize bag peel.

After the inner bag 62 is installed, the feed tube is externally clamped with pliers. The end of the feed tube is also temporarily closed off with gum rubber sealant such as that used for the bag seals 55, FIGS. 2, 8, 10, 11 and 56. Caps and ferrules are slid on the tubes 8. The ends of the vacuum tubes are slid into the fittings 16 installed in the drop out tank 9. The ends of the tubes are positioned at sufficient depth that the resin will drop into the disposable steel can 10. With the vacuum tubes at the proper depth, the caps are threaded onto the fittings to swage the ferrules on the tubes creating a seal to the drop out tank 9. Gum rubber sealant is wrapped around the fittings and caps to provide extra seal integrity at the tube to drop out can joints.

A vacuum source 11 Is connected to the drop out tank 9 to pull vacuum on the installed inner bag 62. The vacuum line typically has quick connect fittings on both ends allowing it to be easily attached to the drop out tank and vacuum source. Once the bag is pulled tight with vacuum, the vacuum level is checked with a precision, vacuum test gauge or vacuum transducer 12. If the part has an obviously low vacuum level as indicated by the gauge or signals from the vacuum pump, the bag and connections are checked with a leak detector until the leak is found and repaired. With a high efficiency vacuum pump, the vacuum level should exceed 28 inches of Hg. A vacuum in excess of 29 inches of Hg is preferred because it provides additional preform compaction.

AIRWEAVE N-10 or SUPERWEAVE UHT 800 Breather 63 (FIG. 2, 8, 10, 11) is placed over the inner bag and extends close to but not in contact with the outer bag sealant 55. The breather can be fiberglass cloth, fiberglass mats, flow media, or steel wool (for infrared flow front detection).

Outer bag 64 is installed over the breather 63 in a similar manner as the inner bag 62. The outer bag is sealed to the tool 50 with the sealant 55 and pressure sensitive tape 57. To apply vacuum to the cavity between the inner and outer bags, a through-the-bag fitting 20 is typically used, although through-the-tool or through-the-seal tubes could also be used. The fitting is connected to a vacuum hose 13 that is also equipped with quick connect fittings on both ends. The vacuum integrity of the outer bag is checked in the same manner as the inner bag.

The inner bag vacuum level should equal or exceed the vacuum level between the inner and outer bags so that a pressure is exerted on the inner bag from the chamber defined by the inner and outer bags. This situation occurs naturally when both the inner and outer bags are connected to the same vacuum source. If the outer bag vacuum level exceeds the inner bag vacuum level, the inner bag can be slightly displaced with less effective compaction of the preform.

Vacuum Dry Out

Once the preform is bagged and plumbed, we generally prefer to heat the preform under vacuum to dry it. We can complete the drying step in a convection oven, on hot plates, or on heated vacuum debulk tables, such as those produced by Brisk Heat. Debulking compacts the preform, drives off volatiles that may be trapped in the preform or bagging materials, and uniformly disperses meltable binders into the preform through capillary action. The inner and outer seals are advanced through their softest, critical stage where they are most likely to develop leaks. The sealant bond to the bags improves through the rubber curing process providing increased vacuum integrity. If a leak should develop during the critical soft phase in the gum rubber sealant, it is of no consequence since the infusion resin is not present. Leaks discovered at elevated temperature can be easily repaired and confidence in the bag integrity is enhanced. Drying helps to seat the edge sealants and vacuum forms the bagging materials to the preform materials creating a superior fit. This fit improvement helps to eliminate possible resin channeling and bridging which would allow the formation of resin rich areas in the composite.

The preferred temperature cycle for the vacuum drying depends on the preform materials in the bagging system. In a typical infusion, the tool, preform, and bagging materials are heated rapidly to 250.degree. F., held at that temperature for 1 hour, and cooled to the infusion temperature. For stitched preforms and 3-D woven preforms, the cycle is normally 2 hours at 350.degree. F. because of the hydroscopic nature of the organic stitching fibers and the water lubricants used in 3-D weave process with carbon fibers. In some cases, such as preforms containing syntactic foam cores, heating is not allowed because it will melt and destroy the foam. Binders also play a significant role in determining the appropriate dry out procedure. For "soft" cyanate ester binderized preforms where the binder is more soluble in the infusion resin, the cycle may be 1 hr at 160.degree. F. or ½ hour at 200.degree. F. This cycle has a high enough temperature to melt the binder material, to drive off residual carrier solvents, and to wick the binder into the preform. This temperature is low enough to prevent significant advancement in the degree of cure. For "semi-rigid" preforms binderized with catalyzed M-20 cyanate ester, the cycle may be 1 hour at 250.degree. F. The heated, vacuum dry out cycles will vary, but, in general, they have very positive effects on the overall infusion process.

Infusion of the Preform

The resin selected will dictate a number of the processing parameters selected for the infusion process, including the mixing and dispensing techniques, infusion temperature, flow lengths, working times, degree of temperature control, flow lengths, and flow media selection.

Preferred resins from a processing perspective have some or all of the following characteristics:

a. Long pot lives at the infusion temperature (several hours or more) to allow complex infusions and to ease timing constraints;

b. 1 or 2 part resins for mixing simplicity;

c. Can be mixed and infused at room temperature for out of oven operation, operator comfort, improved process control, more rapid processing with simpler and less equipment, allow simplified real-time mass balances, and are more readily adapted for recirculation techniques;

d. Have a viscosity in the range of 100-350 centipoise to allow rapid infusion without channeling and reduced plumbing requirements for large part fabrications;

e. Can be mixed in large batches without potential for hazardous exothermic conditions;

f. Are non-toxic and non-carcinogenic;

g. Can be stored at room temperature in the unmixed state to eliminate need for thawing and freezers;

h. Are quick curing for reduced cycle time and greater oven throughput;

i. Have low surface tension for improved wet out;

j. Do not release volatiles or other gases under high vacuum;

k. Have low heat of reaction to allow fabrication of thick parts;

l. Cure at low temperatures to allow lower cost master production tools;

m. Are compatible with bagging materials to minimize risk of vacuum failure arising from the resin attacking the bags;

n. Are recyclable to reduce waste;

o. Are low cost with high temperature performance for demanding applications;

p. Allow infusion at minimum viscosity in an end game scenario to increase fiber volumes and reduce likelihood of loss of hydrostatic pressure during cure;

q. Are amorphous (do not crystallize) during storage;

r. Do not gel prior to being heated to a maximum cure temperature to eliminate tool stress on freshly gelled, complex components;

s. Possess consistent and repeatable gel times batch to batch.

Preferred resins include Bryte Technologies EX-1510 and EX-1545, cyanate esters, ATARD Laboratories SI-ZG 5A anhydride based epoxy, and Cytec-Fiberite's 823 epoxy. Preferred resins are low viscosity liquids at room temperature and consequently do not require heating for infusion. Some resins such as Ciba Geigy's 8611 are thick viscous liquids at room temperature (between say 1,000-10,000 centipoise) and must be heated to relatively low temperatures (between 100-160.degree. F. typically) to reach an acceptable viscosity (less than 400 centipoise). Other resins such as 3M's PR 500 and Cytec Fiberite's 5250-4-RTM are semi-solids at room temperature and must be melted at relatively high temperatures to infuse in an acceptable viscosity range. We shy away from resins that have short pot lives or excessively long cure cycles. We also avoid resins that suffer microcracking when cured.

Batch resin preparation for the low viscosity liquid materials is relatively easy and simple. Components are accurately dispensed together on a precision balance, mixed for several minutes with an open air pneumatic driven stirrer, and then de-aired in a vacuum bell jar or equivalent for 5 to 10 minutes. If a vacuum mixer is available, the resin can be mixed and de-aired simultaneously. Viscosity checks can be made with a Brookefield type viscometer.

For viscous liquids, the mixing must be performed on a hot plate with subsequent de-airing in a vacuum oven to prevent cooling. The mixing, heating, and de-airing operations could also be performed in a jacketed vacuum mixer equipped with heating capabilities. Careful temperature monitoring is usually necessary to establish uniform desired temperature in the blend and avoid possible hazardous exothermic conditions.

Semi-solid materials are most efficiently dispensed and heated using a Graco hot melt dispenser. These resins are normally de-aired in vacuum ovens to minimize cooling.

Once the resin is mixed, heated (if required), and de-aired, the mass of resin to be charged to the system can be determined. The amount of resin required for an infusion is typically the sum of the resin required to fill the tubes, preform, flow media, plus an excess working quantity of between 400 and 1000 grams. The amount of excess required is dependent on the part configuration, the number of supply containers, and whether recirculation techniques are employed.

Because the double bag vacuum infusion process has a closed loop system for the resin, mass balances can be performed to estimate the resin content or fiber volume of a given part prior to cure.

The weight of the preform can be measured directly or be estimated from known preform ply areas and nominal areal weights. With the resin and preform weights and density (i.e., specific gravity), resin content and fiber volume can be easily determined.

Using precision balances on the feed container 14 and the drop out can 10, mass flow rates, fluid velocities, percent preform fill, and fiber volumes can be determined at every stage of the infusion. For the drop out scale to work properly and have sufficient sensitivity, it must be placed inside the vacuum drop out tank with vacuum seals to route the power supply and feed back to the data acquisition equipment.

When the resin must be infused at elevated temperature onto a hot tool, the operation must be performed in an oven or the tool and/or resin must be heated. For ambient processing, the infusion can be performed in practically any convenient location or in the oven directly. If the infusion is performed outside the oven, processing capacity is maximized. When infusions are performed outside the oven, it is important that vacuum level in the outer bag does not decrease during the transfer from the infusion site to the oven for cure.

To begin the infusion, the end of the tube 8 is cut with a tube cutter to remove the portion of the tube with the sealant plug. An external constricting device is installed on the feed tube to reduce the flow rate of the resin in the initial phase of the infusion. Without this feed constraint, the resin tends to shoot into the part too rapidly and can trap voids behind the wave front that are difficult to remove. The end of the feed tube is placed in the feed container 14 near the base and is secured. The feed may be tilted at an angle with the feed tube positioned in the lowest location to minimize the amount of resin required to prevent air from entering the tube and bagged preform. To initiate flow, the sheet metal or welding clamp is removed. After a few minutes of infusion, the constricting device is normally removed from the feed tube to speed the infusion rate.

The feed can be positioned below the lowest part of the preform. Positive pressure feed to the preform causes the inner bag to bulge near the feed spring. The vacuum tubes, on the other hand, should rise above the preform to help maintain hydrostatic pressure on the fluid and to minimize resin drain from the preform into the drop out can. Although preforms can be infused successfully in the horizontal orientation, it is often preferable to infuse in an inclined or vertical orientation with the feed at the lowest end and the vacuum pulled at the highest end. Inclined or vertical orientations tend to reduce channeling effects in low viscosity resin systems and in preforms with high variations in permeability. These orientations can also be used to eliminate otherwise necessary plumbing.

As the infusion progresses, the infusion rate gradually slows. The infusion rate drops because of the increasing drag and pressure drop as the fluid wets the preform. With a single layer of flow media, a single feed line or spring efficiently infuses 3-4 linear feet of preform in approximately 1 hour. Flow lengths can be as much as 5-6 feet before an additional feed line is required.

When resin reaches the vacuum end of the preform, the resin will fill the vacuum tubes, and, then, cascade into the drop out can 10. Because the vacuum tubing has very high permeability relative to the preform, the fully wetted preform can be drained locally on the vacuum end resulting in loss of hydrostatic pressure on the resin in the preform. As the preform drains, the resin flow into the vacuum tubing decreases. At some point the resin feed to the preform exceeds the draining and the preform will begin to fill again. The process of filling and draining the preform locally at the vacuum end of the preform will cycle repeatedly unless active measures are taken. Bubbling in the vacuum tube is often associated with this phenomenon. The rate of the bubbling increases as the preform drains and decreases as the preform fills.

If the feed and vacuum tube lines are clamped and cut when the preform has low hydrostatic resin pressure or is partially filled, the resulting part will have surface porosity and in more severe cases, internal porosity. These defects will typically be located on the vacuum end of the preform. Consequently, it is essential to cut, clamp, and seal the lines when the preform is fill.

The vacuum lines should be throttled or choked to a near closed position until the mass flow rate of resin through the preform equals the mass flow rate in the vacuum tube. In the choked condition, the resin feed to the preform and the tubes exceed the pull off capability downstream of the choke point. Consequently the preform will completely fill. As the preform fills, the mass flow rates in the preform will eventually decrease to match the mass flow rate beyond the choke point. Once this quasi-steady state is reached where the feed and pull off rates are equal and the preform is full, the bubbling action associated with the fill and drain phenomena ceases. The vacuum tube between the preform and the tube choke point eventually fills with bubble free resin. The system normally reaches a quasi-steady state after approximately 15 minutes of choke flow processing.

External clamps are typically used to throttle the flow, but internal plugs, nozzles, sintered metals/ceramics, filters, two position ball valves, or precision metering valves might also be used. In the case of a two position ball valve, the open position would allow complete unconstrained flow. In the closed position, the ball valve has a small orifice allowing limited flow. Of course, variants from these concepts are possible to achieve the same results. The plugs, nozzles, filters and sintered materials can be positioned in the tube between the compressed seal footprints areas as a method of holding the devices.

Another approach that can be used to prevent preform draining is to regulate the vacuum on the inner bag. Reducing the vacuum level reduced the flow rates in the tubes. The preform has a lower tendency to drain, especially for more viscous resins that have sufficient body to move through a preform as a continuous pool. The resin also has little tendency to separate into discrete fluid bodies. Using this approach, the inner bag vacuum level is typically dropped from 29+ inches Hg to 22-27 inches Hg. Shortly after dropping the vacuum level, the bubbling will stop as with the throttling devices. A problem with this approach is that the inner bag moves toward the outer bag because of the reduced vacuum. Movement decreases preform compaction and ultimately produces lower fiber volume composites.

After the preform is completely filled with resin and the resin flow rate is constant, the feed and vacuum tubes are clamped closed simultaneously with sheet metal or welding pliers. The vacuum source is disconnected from the drop out tank. Both vacuum tubes and the feed tube are cut near the welding pliers. The resin in the vacuum tubes is sucked into the drop out tank and the resin in the feed tube drains into the feed container. The process results in complete resin reclamation and allows near time mass balances to be performed. The ends of the cut vacuum tubes and feed tube are sealed with pressure-sensitive adhesive tape and then wrapped with vacuum bag sealant tape. The tube seals are simply a redundant measure to prevent air from entering the inner bag in the event the welding pliers fail to isolate the inner bag from atmospheric pressure. Prior to beginning cure, the bulk resin in the feed can and the drop out can is removed from the oven to prevent unwanted hazardous exothermic reaction. Likewise, all other tool and consumable materials are removed prior to closing the oven for cure.

Our preferred process allows resin recycling or recirculation. In some complex infusions where, for example, separate wave fronts converge together, extra resin may need to be purged from the preform to removed trapped air or voids. Resin recirculation rather than continuous purging minimizes resin waste and expense. With recirculation, excess resin is typically charged to the system to have a reasonable working volume. The resin is allowed to accumulate in the drop out can. Once the resin in the supply can begins to run low, the feed and vacuum tubes are clamped shut. The vacuum source to the drop out tank is disconnected and the vacuum is released using the quick connect fittings. With the vacuum released, the lid on the drop out tank can be removed, and resin drained into the can from the tubes. The resin in the drop out can is transferred to the source container. Sufficient time, usually about 5 minutes, is given to allow entrained air to percolate out of the resin before flow is reinitiated. The drop out tank is reassembled and evacuated with a separate isolated vacuum pump to prevent any possible vacuum decrease in the outer bag. Once the tank is at the original vacuum level, all tube clamps are released simultaneously establishing flow again. The process can be repeated until all voids and bubbles are removed from the preform. At this point, the infusion can be terminated.

Batch infusion and cure processing is possible. The only potential constraint is the number of infused parts that can be loaded in the oven. If parts are infused serially, excess working resin from any prior completed infusion can be used as is or blended with virgin resin for subsequent infusions.

As previously described, a vacuum tube mounted on a stiffener, for example, can be used to infuse that stiffener and thereafter be converted into a feed line for the next infusion bay or section (FIG. 4). This conversion between feed and vacuum uses a T or Y fitting 19. One leg of the T connection is connected to a resin supply, but can be clamped or closed with a valve while the other leg is left open and connected to the vacuum drop out tank 9. Once resin begins to fill the vacuum line 8 and clears the T fitting 19 with no bubbles, the tube 8 exiting the bag is closed and the leg to the resin supply is opened. The supply tube 8 fills with resin and purges air from all tubing 8. Once the tubes 8 are filled, the tube 8 leading to the vacuum drop out tank 9 is closed shut and the tube 8 exiting the bag is opened allowing a new resin supply to feed the preform.

Our process might be usable to produce carbon/carbon and ceramic matrix composites through multiple infusions, cures, and densification of the same preform materials.

Resin Cure

Once the infusion is completed, high vacuum must be maintained in the outer bag of the infused preform throughout the cure cycle, especially immediately before and during resin gelation. Vacuum loss during this critical stage will cause the inner bag to relax, resulting in increase volume in the inner bag. The infused preform will swell because resin cannot be added in the closed system. The swelling reduces the hydrostatic pressure which produces surface porosity and voids, reduced preform compaction, and lower fiber volumes.

Because of the critical nature of the outer bag vacuum level, we use vacuum transducers, data acquisition equipment, and Labview software to monitor continuously the vacuum pressure throughout the cure. Oven and tool temperatures are also continuously recorded and displayed in real time. Because of the risk to vacuum integrity, monitoring thermocouples are not introduced into the bag. Viewing windows in the oven are desirable to observe the cure in progress.

Our process has been developed primarily for thermally curing (heating) the resins. Alternative curing methods such as electron beam curing, UV curing, and microwave curing can be used with heat or independently or in combination with appropriate resins and bagging materials.

Low temperature curing resins have the advantage that they can be cured on low cost tooling with better dimensional control, particularly on complex co-cured assemblies. Some room temperature curing resins have hazardous exothermic reactions in bulk quantities. To circumvent this problem, special meter mix, vacuum de-airing equipment is necessary to dispense resin into the supply can on demand.

Postcure

Postcure requirements depend on the infusion resin and the desired operating temperature of the structure. Postcure may be performed on the bond jig tooling, simple support fixtures, or free standing with or without glass fabric covers to protect from oxidation or foreign contamination. If postcure is desired, generally it subjects the composite to a temperature cycle for an extended period.

Trim and Inspection

Typically composites, including those made using our process, must be trimmed around the periphery to the final, desired dimensions for the part. Trimming can be done with a router, water jet cutter, by rough cutting and grinding to a trim line, or any other appropriate method.

Certain features, such as blade stiffeners, and pi or clevis type joints can be net molded using "soft" or "hard" binderized preforms or fibrous preforms without binders, such as multiaxial warp knit fabrics that are inherently stable. Deflashing excess resin is the only operation required. Net molded features can be laid up in the net configuration or oversized as a preform. For oversized preforms, the layup can be trimmed before infusing the layup tooling as a trim guide. Soft binderized preforms can be cut flush with the tool blocks after a room temperature or low elevated temperature vacuum bag debulk to provide definition and consolidation. Semi-rigid "hard" binderized preforms tend to give better edge definition when trimmed. These semi-rigid preforms are typically made using an elevated temperature vacuum bag debulk.

The composites can, then, be inspected using any one or all of many non-destructive inspection (NDI) techniques of the type typically used to inspect autoclave-cured composites, including ultrasonic and radiographic techniques. Inspection may be avoided if certain in-process controls are used throughout the manufacturing process. Visual observation of the flow through windowing in the breather material, use of optically clear tooling made, for example, from PYREX or LEXAN, and optically clear or translucent tubing provide indications of quality during the infusion. Similarly, mass balances, infrared flow front detection, imbedded sensors, or flush tool mount sensors can provide in-process indications of quality. Visual inspection of the laminates after processing generally is a good indicator of their quality. If the laminates do not have surface porosity (particularly on the tool side), if the thickness is within nominal limits, and if the composite rings when "coin tapped" (see, e.g., U.S. patent application Ser. No. 08/944,885), the laminates will likely pass ultrasonic inspection. If any surface voids appear on the parts, ultrasonic inspection is warranted. Because we have determined that there is a strong correlation between the existence of surface voids and the overall composite quality, simple inspection for surface voids can significantly reduce or even eliminate more sophisticated inspection using expensive ultrasonic, laser, or radiographic processes.

Advanced Processing Techniques

Figure 7:
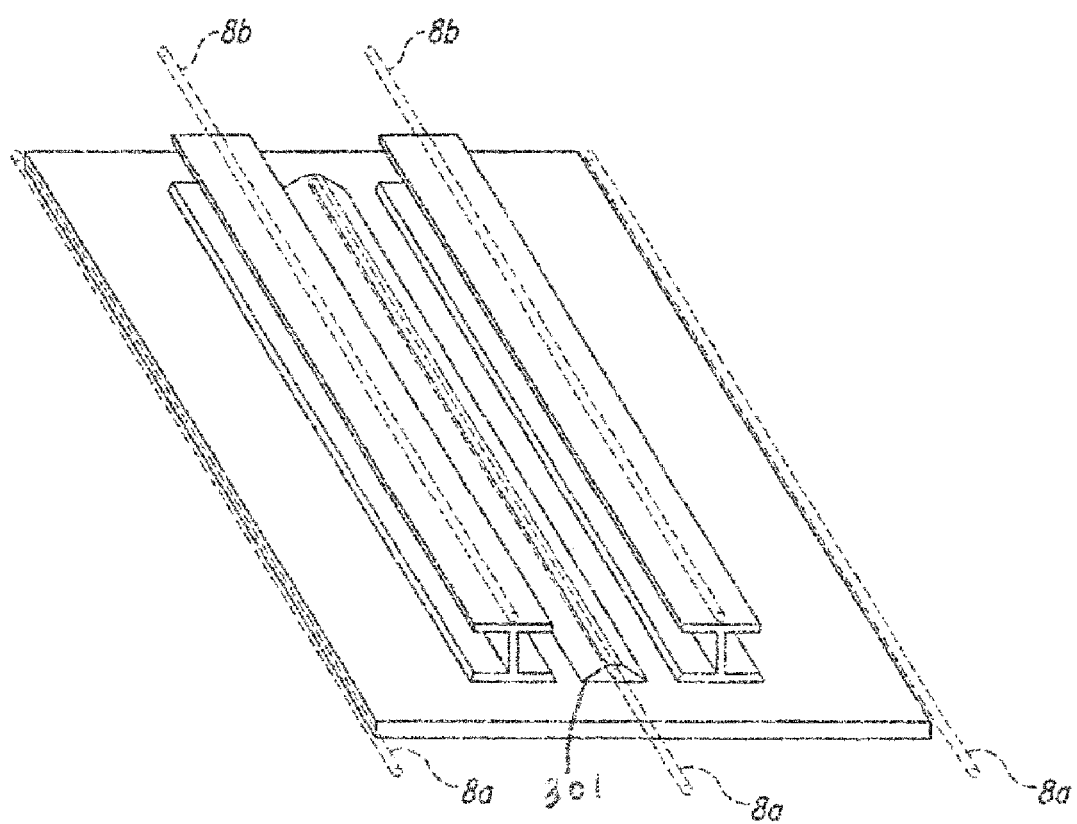
FIG. 7 shows the typical plumbing used for infusing an I-beam stiffened panel.
Figure 8:
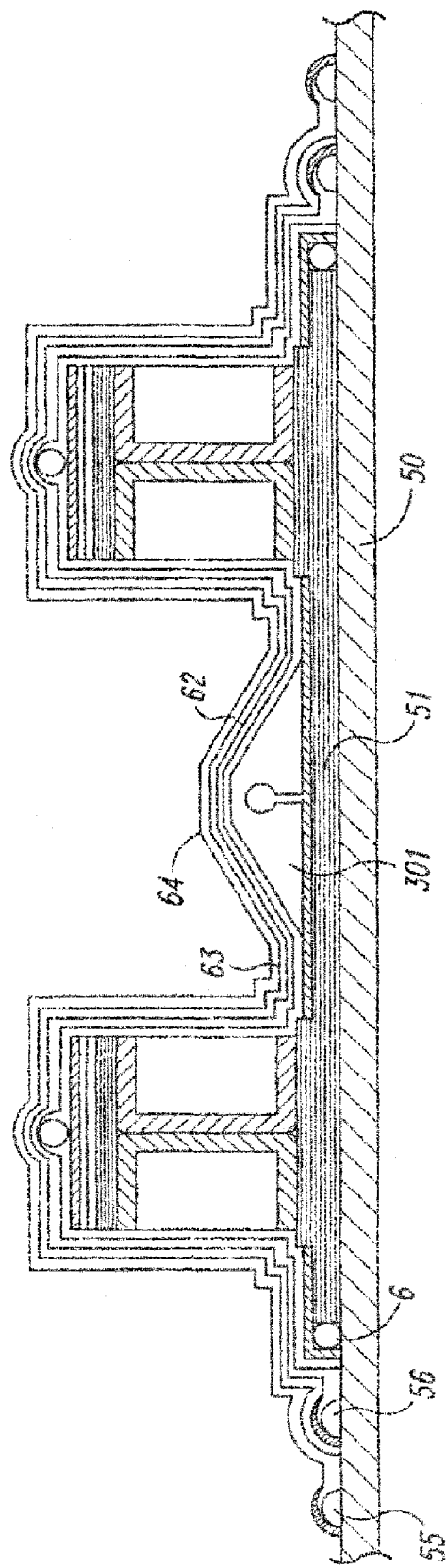
FIG. 8 is a bagging schematic cross-section of the infusion of an I-beam stiffened panel shown in FIG. 7.

Our process is able to fabricate complex structural assemblies, such as the I-beam stiffened skin shown in FIGS. 7 and 8. Conformal tube fairings located between I-beams are used to deliver resin in the difficult to reach bay zones. Edge feed tubes supply resin to the edges of the skin. Vacuum tubes located at the tops of the I-beams are used to draw the resin through the skin and up through the I-beams. To infuse this assembly, all feed lines 8a are opened at the same time. The wave fronts generated from the three feed sources converge around the base of the I-beams and are drawn up into the I-beam toward the vacuum tubes. When the resin reaches the top of the I-beam web, the flow splits to wet out each flange on the cap. The resin eventually wraps around the caul plate and works its way to the vacuum tube 8b. The infusion is completed, and the composite cured in the normal manner. This technique can be extended to produce assemblies with a large number of bays as may be found in aircraft wings.

Figure 9:
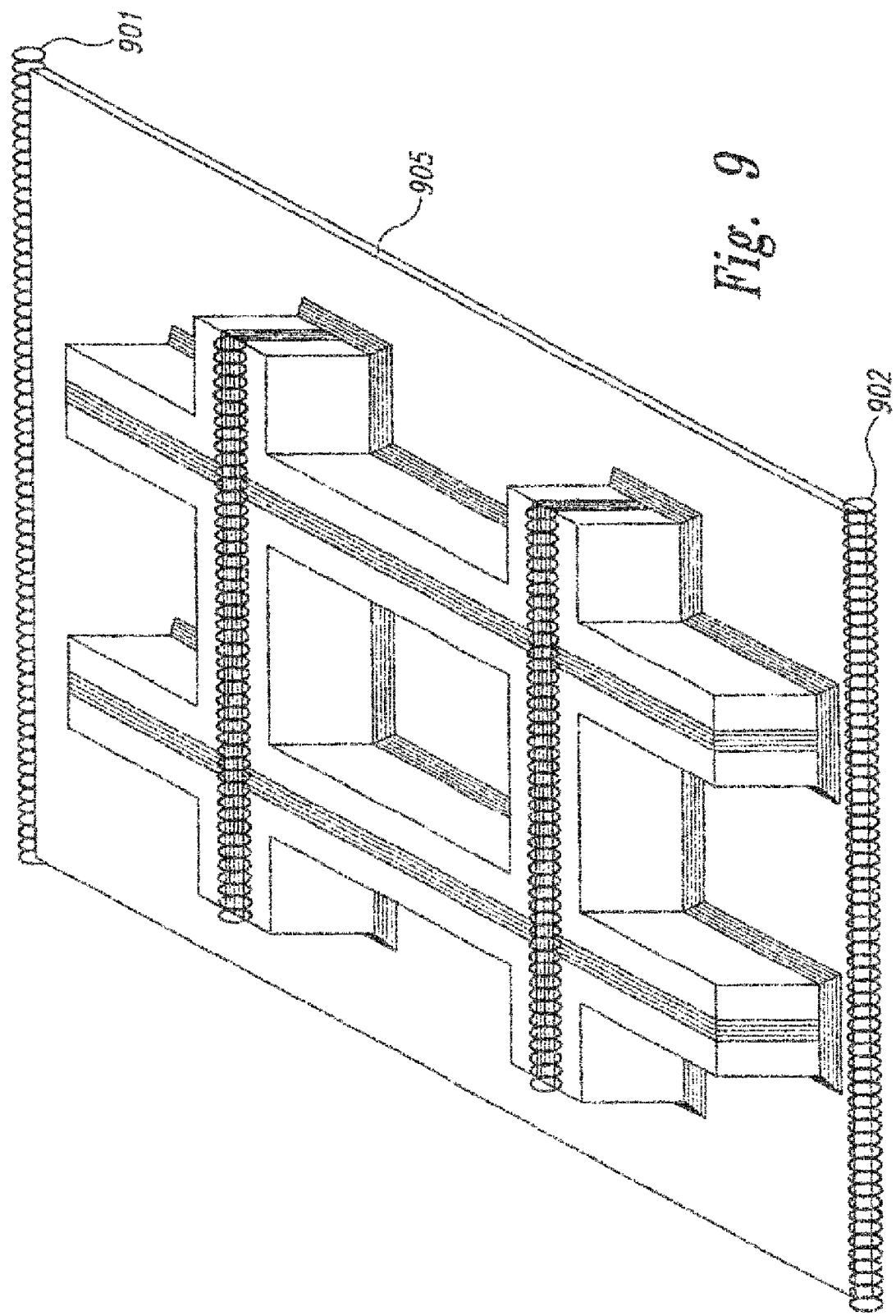
FIG. 9 illustrates typical plumbing for infusing an intersecting blade preform.
Figure 10:
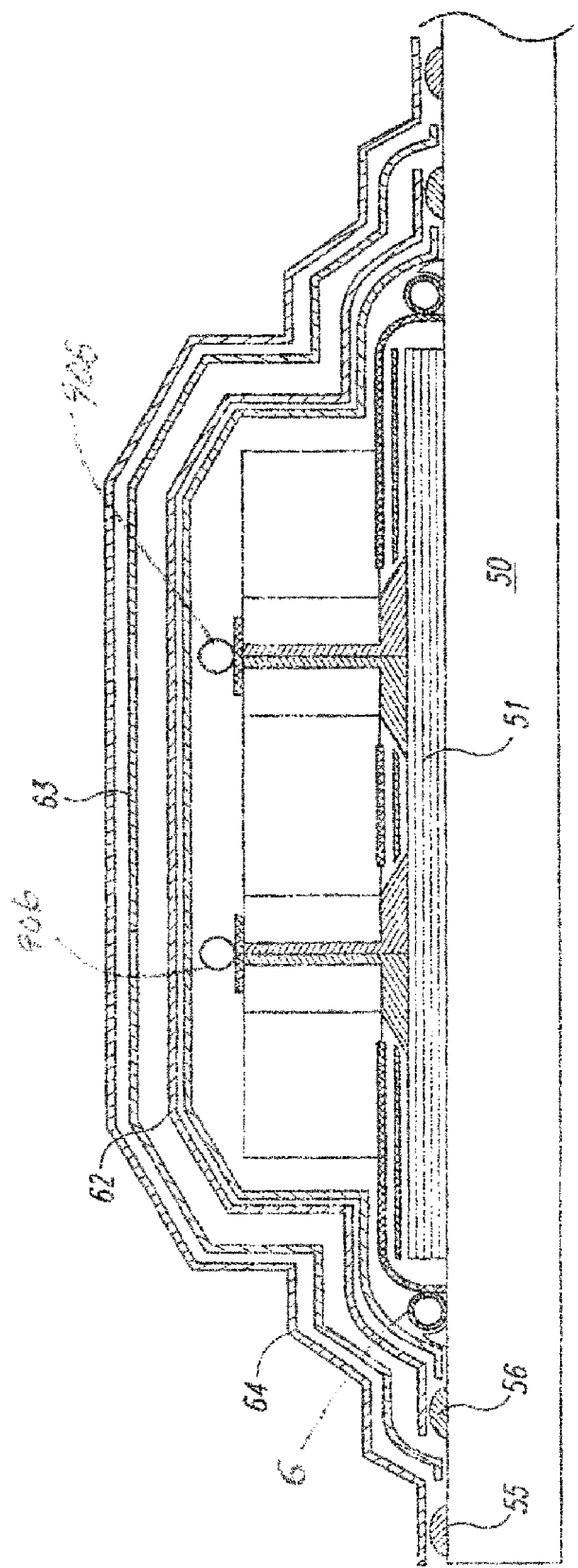
FIG. 10 is a bagging schematic cross-section, similar to FIG. 8, of the intersecting blade preform infusion.

Another example of the capability to produce complex structure with our preferred process is shown in FIGS. 9 and 10. The intersecting blade stiffened panel uses binderized material for forming the intersecting blades on simple aluminum block tools. Binderized material can be used if desired, but it is unnecessary for the skin 905. To infuse the preform only one feed line and one vacuum line are required provided the preform is vertically infused and novel passive vacuum chambers (PVCs) 906 are used. The part is bagged in the horizontal position. Once bagged, the base plate can be flipped in the vertical orientation without any bagside tool movement. As the preform is infused, the resin fills the vertical blade with no plumbing required. Passive vacuum chambers are used to pull resin into the horizontal blades and provide some limited purge capability. Air Dam I gum rubber sealant is used at the ends of the blades in conjunction with the flow media to eliminate mark off at the blade terminations. The intersecting blades are net molded with only minimal flash removal required.

Figure 11:
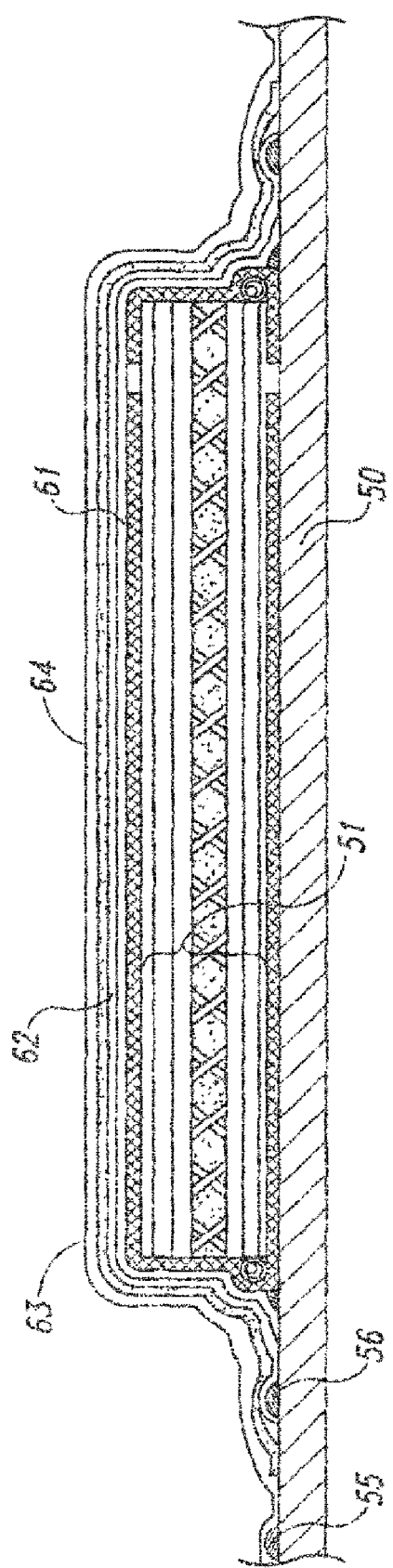
FIG. 11 is a bagging schematic cross-section for a truss stiffened sandwich panel.

FIG. 11 shows a bagging schematic cross-section for a truss stiffened sandwich panel. Again, the preform is bagged horizontally and flipped vertically for the infusion. One feed line is used at the bottom of the skin and one vacuum line at the top of the skin. This conversion method permits fabrication of very wide assemblies with no mark off from plumbing devices.

We believe that the following concepts of the present invention that we have described are novel liquid molding techniques of the present invention alone or in combination.
1. Double Bag Infusion
2. Binder Technology
3. High Elongation Bagging Films
4. TEFLON-impregnated Flow Media
5. TEFLON Tubing in Infusion Processes
6. TEFLON Tubing Etch Process
7. Large Tubing Footprints in Seal Locations
8. TEFLON Tube Forming for Zero Stress Bends
9. Tubing Strain Relief Devices
10. Inert Barrier Films for Bag Protection
11. Low Flow Gum Rubber Edge Sealant
12. Passive Vacuum Chambers (PVCs)
13. Conformal Tube Fairings (CTFs)
14. Flexible Tooling for Contoured Blade Stiffeners
15. External Tube Clamping Feature
16. Drop Out Tank and Can For Easy Cleanup and Recirculation
17. Positions of Feed Can and Drop Out Cans
18. Recirculation Techniques For Difficult Infusions
19. Integrally Cast Seal on Drop Out Tank Lids
20. Real Time (or Pseudo-Real-Time) Mass Balances to Control Fiber Volumes
21. Infrared Flow Front Detection
22. Radio Frequency Identification Embedded Tags
23. PYREX Optical Tooling
24. Coarse Flow Media Optical Breather
25. Split Swage Tool
26. Gum Rubber Sealant at Discontinuities For Reduced Mark off and bridging
27. Pocket Skeletal Structures
28. Heated Vacuum Dry Out Procedures
29. Inclined or Vertical Infusion Orientations
30. In Mold Binderization
31. Design With Feed Capacity Greater Than Pull Off Capability
32. Vacuum Tube Throttling at End of Infusion
33. Feed Tube Resin Constriction at Start of Infusion
34. Techniques for Infusing Truss Reinforced Sandwich Panels
35. Techniques for Infusing Intersecting blades, hats, pi's, J's, I's, and C's
36. Techniques for Fabricating Door Sill Features
37. Leading Edge Sandwich Structures
38. Batch Processing Capability
39. M-20 Cyanate Ester Catalyzed or Uncatalyzed Binder Solutions
40. 5250-4-RTM Binder Solution
41. Robotic Spray Application of Binders for Precision Delivery
42. Electrostatic Spray Application of Binders for Improved Transfer Efficiencies
43. TOWTAC Binderized Tow Materials
44. Automated Concept for Producing and Packing Large Quantities of Binderized Materials
45. Techniques to Produce Soft and Semi-Rigid Preforms
46. Production of Tools From Low Temperature Resistant Master Tools
47. Surface Deposition of Binder on Preform Materials
48. Binders With Low Degree of Cure for Melt in and Chemical Bonding with Infusion Resin
49. Multiple Infusion Techniques, Especially to Produce Densified Carbon/Carbon and Ceramic Matrix Composites
50. Integration of Specialty Materials such as Ground Planes, R-Cards, etc.
51. Inner and Outer Bag Sealant Placements and Tool Preparation
52. High Integrity Seal Features
53. Vacuum Forming Conformal Bagging Films
54. Resin Reclamation and Blending
55. Vacuum Control and Maintenance Prior to Gelation
56. Use of Precision Vacuum Transducers for Early Leak Detection
57. Use of Wash Out Tooling to Create Stiffened Skins
58. Fluid Delivery Through the Bag Seals The outer bag in the double bag system reduces thermal oxidation of the inner bag. This translates into a stronger bag that is less susceptible to leakage during cure at high temperatures. The outer bag and breather buffer the inner bag from handling damage that can occur in many ways. The outer bag applies pressure to the inner bag seals and improves the sealing effectiveness of those seals. The pressure on the inner bag seals overcomes bag peel stresses that can open up leaks, particularly at pleated seal locations. Because the outer bag encapsulates the inner bag, seals can not be worked loose in the convective environment typically found in ovens. If a leak should occur in the inner bag, the result is not necessarily catastrophic as it generally is for single bag infusions. A leak in the inner bag will cause resin to flow into the outer bag. Corrective actions are possible with accelerated cures and bleed control techniques. A ruptured bag in a single bag environment allows air to enter the bag. The bag can swell and porosity can be continuously introduced into the laminate, resulting in catastrophic failure. Bag integrity differences between single bag infusion techniques and double bag techniques may not be significant when producing small, simple, low value composites. When attempting to produce large and/or complex composite assemblies, such as composite wings, the significance of the integrity differences is dramatically amplified. It is wise and prudent to use the double bag technique over single bags when producing these types of structures. Yield, integrity, and process robustness become far more important factors in reducing overall cost than eliminating the cost associated with a second bag.

While we have described preferred embodiments, those skilled in the art will readily recognize alterations, variations, and modifications that might be made to the process or the resulting composites without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

What is claimed is:

1. A double vacuum chamber resin infusion device configured for vacuum assisted resin infusion of a preform comprising:
   a mold configured to support the preform;
   an inner bag sealed to the mold, wherein the inner bag comprises a first flexible high elongation bag, wherein high elongation comprises elongation of 500 percent and higher, wherein the inner bag sealed to the mold comprises a first vacuum chamber, wherein the first vacuum chamber encloses the preform;
   an outer bag sealed to the mold, wherein the outer bag comprises a second flexible high elongation bag, wherein the outer bag encloses the inner bag, and wherein the outer bag sealed to the mold comprises a second vacuum chamber, wherein the second vacuum chamber sealed with respect to the first vacuum chamber, wherein the first and second vacuum chambers each have a separate vacuum integrity with no intercommunication therebetween, each of the first and second vacuum chambers capable of containing respectively different vacuum pressures, wherein the first and the second vacuum chambers are configured to maintain the respectively different vacuum pressures in the first and second vacuum chambers during infusion of resin, and wherein the first and the second vacuum chambers are configured to exert a compressive force on the preform during infusion of resin and curing of resin, wherein the compressive force comprises a caul effect;
   at least one vacuum pump coupled to the first vacuum chamber and the second vacuum chamber and configured to evacuate the second vacuum chamber to a vacuum level less than the vacuum level in the first vacuum chamber; and
   a resin source coupled to the first vacuum chamber, wherein the resin source is configured to infuse the resin into the preform.

2. The double vacuum chamber resin infusion device of claim 1 further comprising at least one passive vacuum chamber (PVC), wherein the passive vacuum chamber comprises an open container positioned in the first vacuum chamber, wherein the at least one passive vacuum chamber is located above the preform, and wherein the at least one passive vacuum chamber is distanced from the resin source.

3. A double vacuum chamber resin infusion device according to claim 1 wherein the preform comprises a tackifier.

4. A double vacuum chamber resin infusion device according to claim 1 further comprising a flow control media located between the preform and the inner bag.

5. A double vacuum chamber resin infusion device according to claim 1 further comprising a breather located between the inner bag and the outer bag.

6. A double vacuum chamber resin infusion device according to claim 1 wherein the resin source is arranged so that resin is infused into the first vacuum chamber at a location below substantially all of the preform so that the resin flows against gravity during infusion.

7. The double vacuum chamber resin infusion device of claim 1 further comprising a conformal tube fairing, wherein the conformal tube fairing comprises an elastic material of constant cross section, wherein a resin feed line is coupled to the conformal tube fairing, and wherein the resin feed. line is coupled to the resin source.

8. A double vacuum chamber resin infusion device comprising:
   a mold configured to support a preform;
   an inner bag sealed to the mold, wherein the inner bag comprises a first flexible high elongation bag, wherein high elongation comprises elongation of 500 percent and higher, wherein the inner bag sealed to the mold comprises a first vacuum chamber, wherein the first vacuum chamber encloses the preform;
   an outer bag sealed to the mold, wherein the outer bag comprises a second flexible high elongation bag, wherein the outer bag encloses the inner bag, and wherein the outer bag sealed to the mold comprises a second vacuum chamber, wherein the second vacuum chamber is sealed with respect to the first vacuum chamber, wherein the first and second vacuum chambers have no intercommunication therebetween, wherein each of the first and second vacuum chambers is configured to contain respectively different vacuum pressures, wherein the first and the second vacuum chambers are configured to maintain the respectively different vacuum pressures in the first and second vacuum chambers during infusion of resin, and wherein the first and the second vacuum chambers are configured to exert a compressive force on the preform during infusion of resin and curing of resin, wherein the compressive force comprises a caul effect;
   a vacuum pump coupled to the first vacuum chamber and the second vacuum chamber and configured to evacuate the second vacuum chamber to a vacuum level less than the vacuum level in the first vacuum chamber; and
   a resin source coupled to the first vacuum chamber, wherein the resin source is configured to infuse the resin into the preform, wherein the resin source is coupled to the first vacuum chamber by tubing, wherein at least one edge of the tubing is chemically etched.

9. A double vacuum chamber resin infusion device comprising:
   a mold configured to support a preform;
   an inner bag sealed to the mold, wherein the inner bag comprises a first flexible high elongation bag, wherein high elongation comprises elongation of 500 percent and higher, wherein the inner bag sealed to the mold comprises a first vacuum chamber, wherein the first vacuum chamber encloses the preform;
   an outer bag sealed to the mold, wherein the outer bag comprises a second flexible high elongation bag, wherein the outer bag encloses the inner bag, and wherein the outer bag sealed to the mold comprises a second vacuum chamber, wherein the second vacuum chamber is sealed with respect to the first vacuum chamber, wherein the first and second vacuum chambers each have no intercommunication therebetween, wherein each of the first and second vacuum chambers is configured to contain respectively different vacuum pressures, and wherein the first and the second vacuum chambers are configured to maintain the respectively different vacuum pressures in the first and second vacuum chambers during infusion of resin;
   a breather located between the inner bag and the outer bag, wherein the inner bag, outer bag, and breather are configured to produce a compressive force on the preform during infusion of resin and curing of resin, wherein the compressive force comprises a caul effect;

a vacuum pump coupled to the first vacuum chamber and the second vacuum chamber and configured to evacuate the second vacuum chamber to a vacuum level less than the vacuum level in the first vacuum chamber; and a resin source coupled to the first vacuum chamber, wherein the resin source is configured to infuse the resin into the preform.

* * * * *